US006579346B1

(12) United States Patent
Esselink

(10) Patent No.: US 6,579,346 B1
(45) Date of Patent: Jun. 17, 2003

(54) PRESSURE SWING ADSORPTION PROCESS

(75) Inventor: Abraham Johan Esselink, Odijk (NL)

(73) Assignee: Esselink BV (NL)

( * ) Notice: Subject to any disclaimer, the term of this patent is extended or adjusted under 35 U.S.C. 154(b) by 0 days.

(21) Appl. No.: 09/868,400

(22) PCT Filed: Oct. 15, 2000

(86) PCT No.: PCT/EP00/10148

§ 371 (c)(1), (2), (4) Date: Jun. 18, 2001

(87) PCT Pub. No.: WO01/28660

PCT Pub. Date: Apr. 26, 2001

(30) Foreign Application Priority Data

Oct. 16, 1999 (NL) ........................................ 1013314

(51) Int. Cl.[7] ........................................ B01D 53/047

(52) U.S. Cl. ............................ 95/98; 95/100; 95/103; 95/105

(58) Field of Search ............................ 95/96–106, 130, 95/138, 139

(56) References Cited

U.S. PATENT DOCUMENTS

| | | | | | |
|---|---|---|---|---|---|
| 3,430,418 | A | * | 3/1969 | Wagner | 95/100 |
| 3,564,816 | A | * | 2/1971 | Batta | 95/100 |
| 3,986,849 | A | * | 10/1976 | Fuderer et al. | 95/100 |
| 4,234,322 | A | * | 11/1980 | DeMeyer et al. | 95/98 X |
| 4,340,398 | A | | 7/1982 | Doshi et al. | 55/25 |
| 4,350,500 | A | * | 9/1982 | Esselink | 95/100 |
| 4,360,362 | A | * | 11/1982 | Asztalos | 95/96 X |
| 4,375,363 | A | * | 3/1983 | Fuderer | 95/97 |
| 4,381,189 | A | * | 4/1983 | Fuderer | 95/100 |
| 4,402,712 | A | * | 9/1983 | Benkmann | 95/98 |
| 4,468,237 | A | * | 8/1984 | Fuderer | 95/100 |
| 4,475,929 | A | * | 10/1984 | Fuderer | 95/97 |
| 4,512,778 | A | * | 4/1985 | Simonet et al. | 95/100 |
| 4,981,499 | A | | 1/1991 | Hay et al. | 55/26 |
| 5,294,247 | A | * | 3/1994 | Scharpf et al. | 95/101 |
| 6,113,672 | A | * | 9/2000 | Kapoor et al. | 95/101 |
| 6,210,466 | B1 | * | 4/2001 | Whysall et al. | 95/100 |

FOREIGN PATENT DOCUMENTS

| | | | |
|---|---|---|---|
| EP | 0 398 339 | 5/1990 | B01D/53/04 |
| EP | 0 513 747 A1 | 5/1992 | B01D/53/04 |
| EP | 0 514 746 A1 | 5/1992 | B01D/53/04 |
| EP | 0 529 513 A2 | 8/1992 | B01D/53/04 |
| EP | 0 538 140 A1 | 10/1992 | B01D/53/04 |
| EP | 0 590 615 A1 | 9/1993 | B01D/53/04 |
| EP | 0 598 319 A1 | 11/1993 | B01D/53/04 |
| EP | 0 598 321 A1 | 11/1993 | C01B/13/02 |
| EP | 0 791 388 A2 | 2/1997 | B01D/53/047 |

* cited by examiner

*Primary Examiner*—Robert H. Spitzer
(74) *Attorney, Agent, or Firm*—Hayes Soloway P.C.

(57) ABSTRACT

A pressure swing adsorption process wherein a constant flow of feed gas and product gas is maintained to and from a pressure swing adsorption installation. A part of repressurization is carried out by a product gas split-off, in three stages, with an additional pressure equilibration step between two adsorbers during the second of the three stages, thereby cyclically fluctuating one of the number of adsorbers receiving feed gas during some period. In addition, either combined herewith or not, in case of the use of a higher purge gas pressure, is the return to a regenerated adsorber of a least impure part of the offgas, driven by its initially higher pressure. The result is an increased product recovery efficiency and an improved flexibility of functioning of the installation.

25 Claims, 33 Drawing Sheets

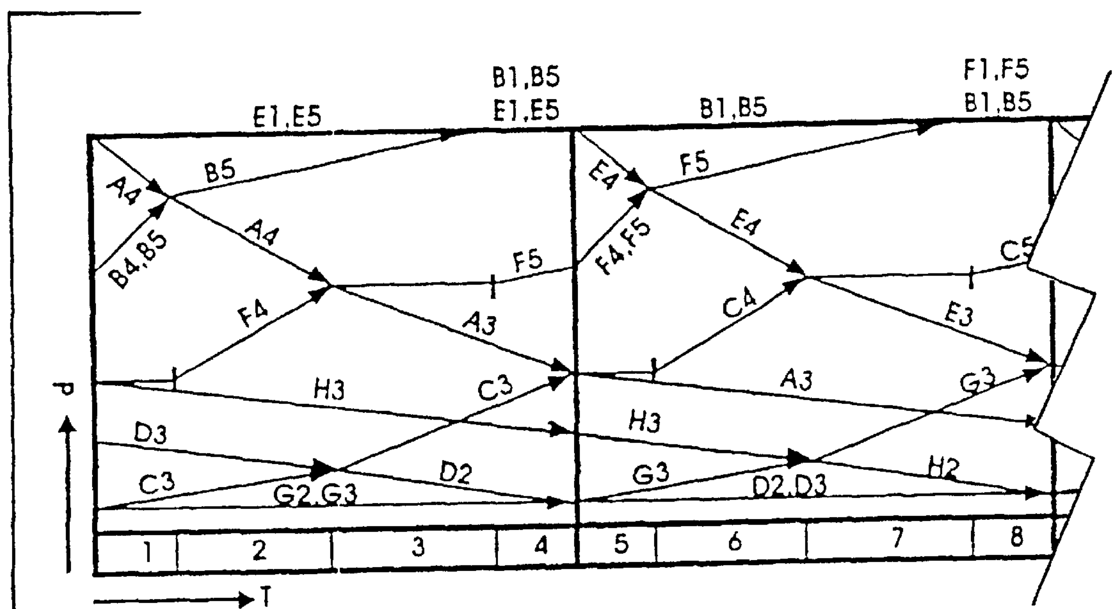
fig.19a.
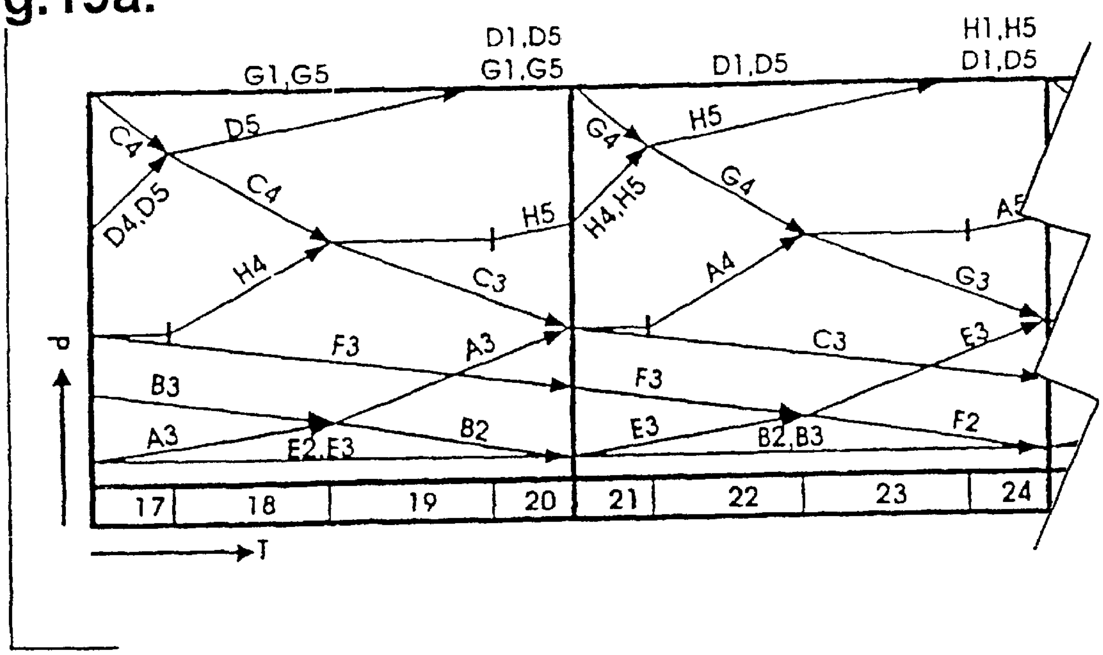

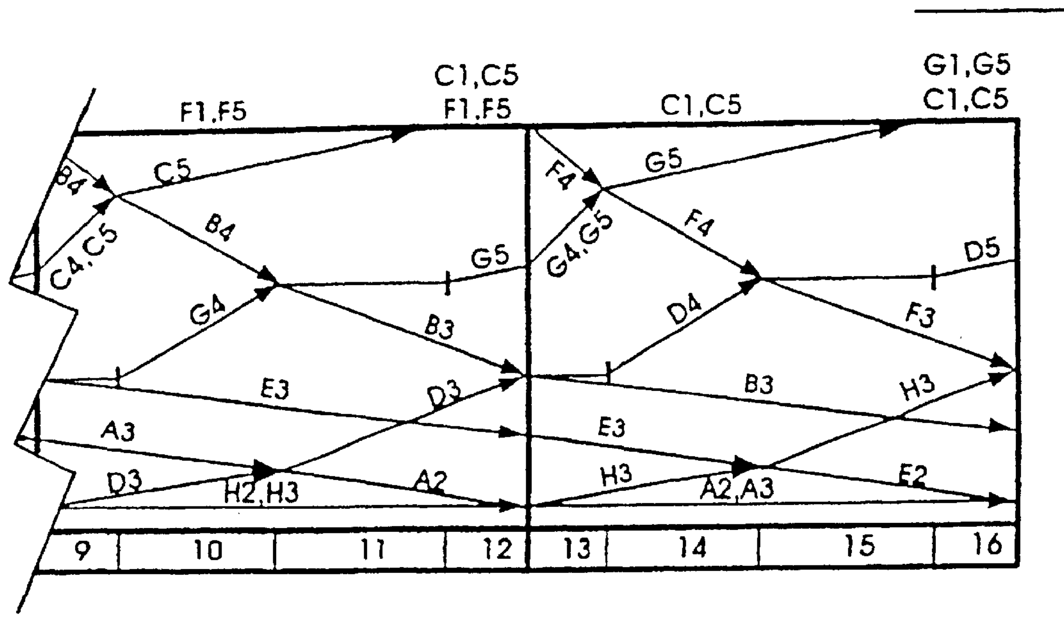
fig.19b.
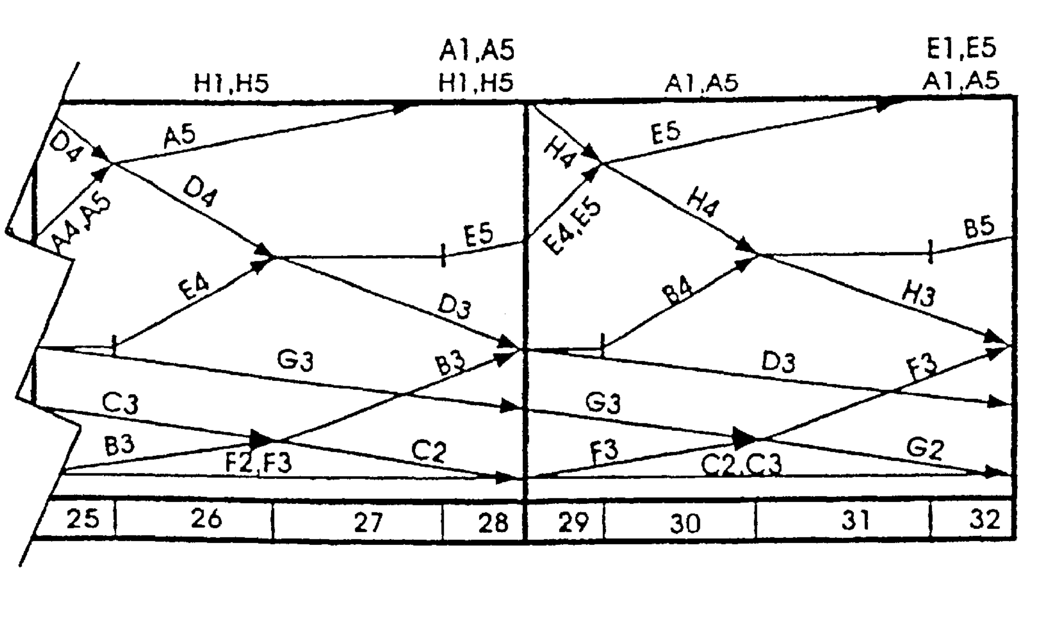

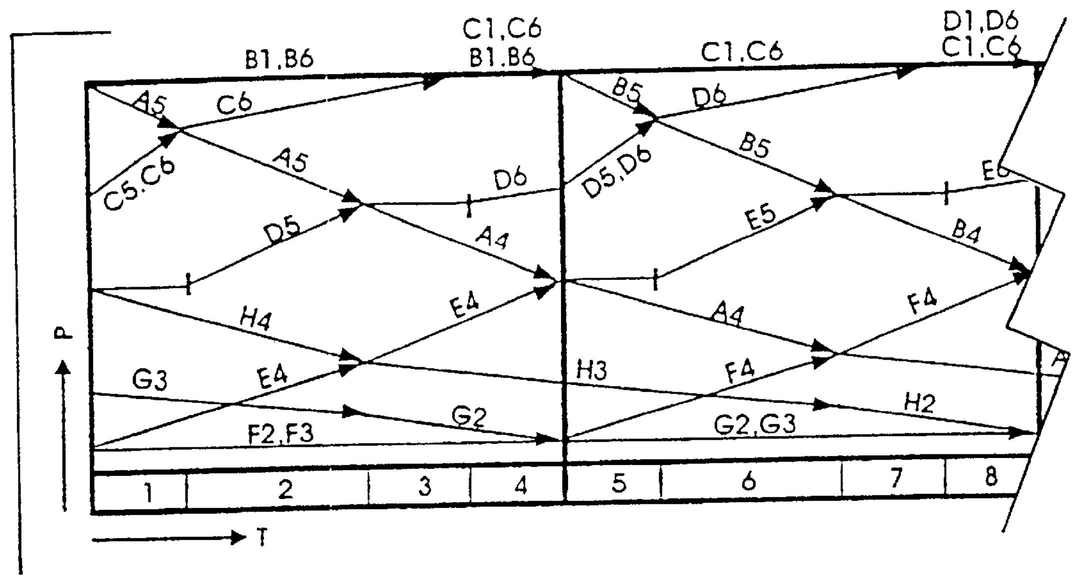
fig.21a.
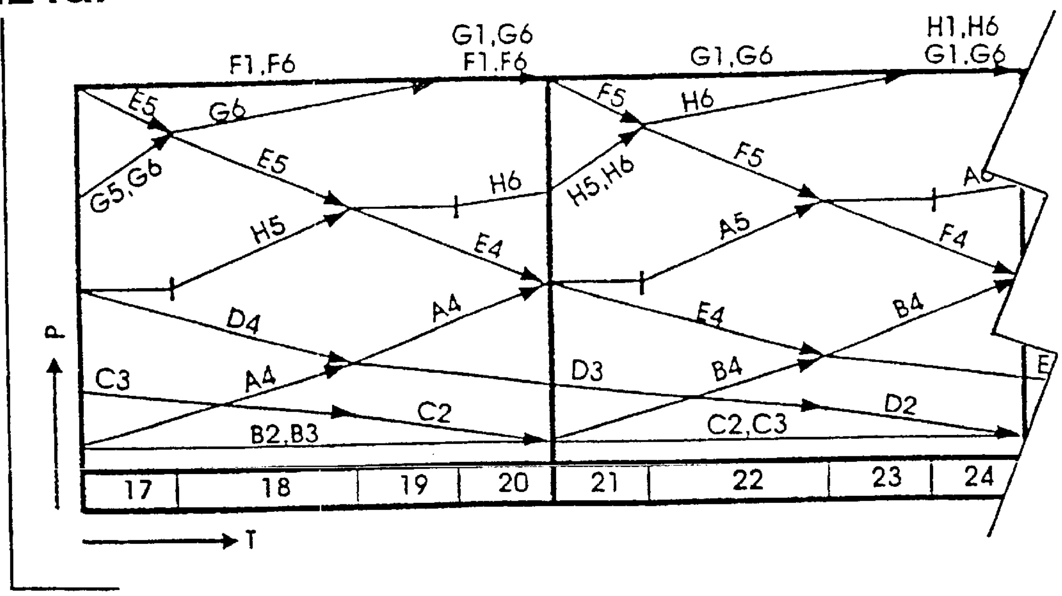

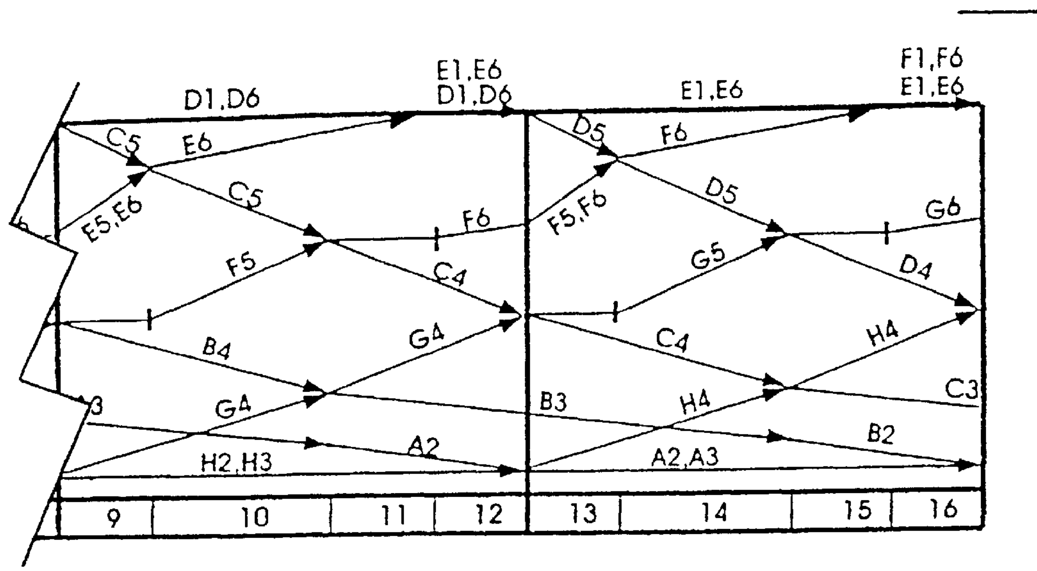
fig.21b.
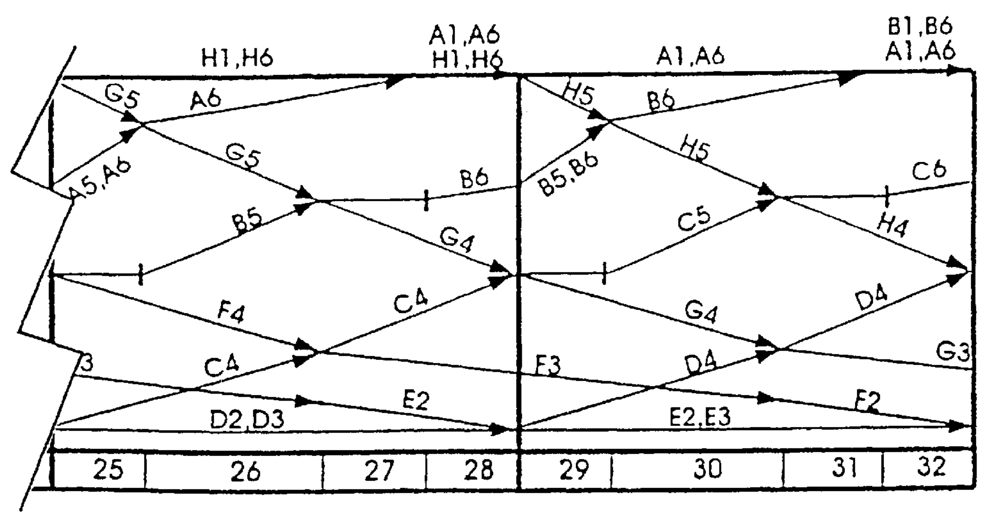

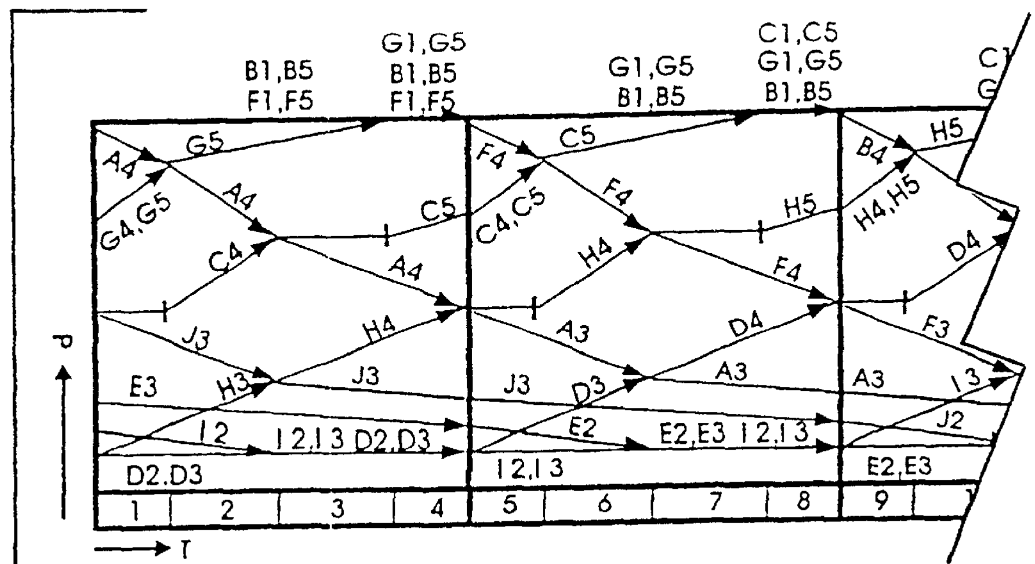
fig.25a.
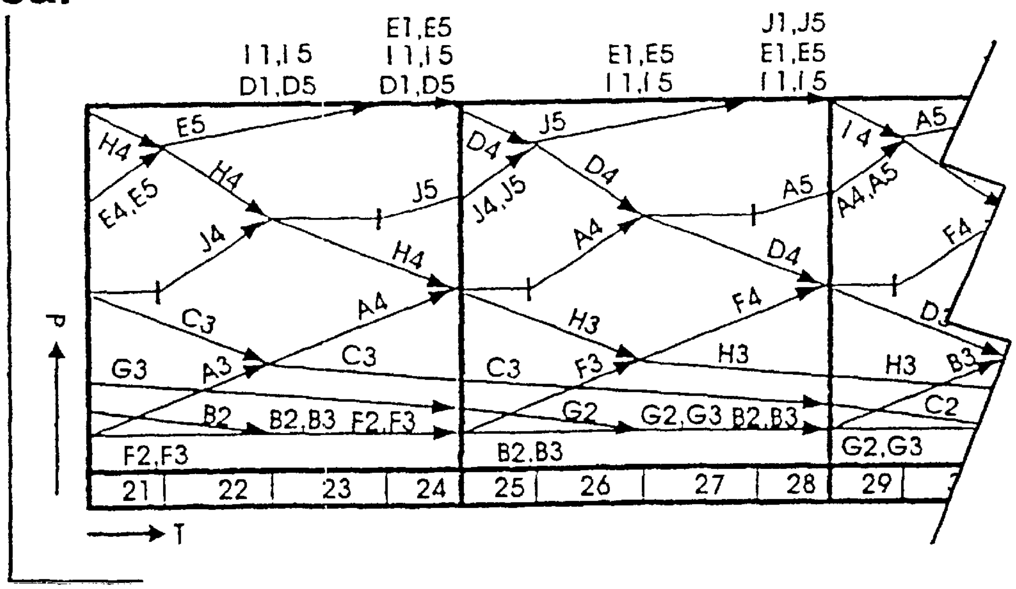

H1.H6. G1.G6. B1.B6
C1,C6
H1,H6
B1,B6
G1,G6
C1.C6. B1.B6. H1.H6
I1,I6
C1.C6
H1,H6
B1,B6
E2.E3.J2.J3
E2.E3
K2.K3.E2.E3
K2.K3
1
2
3
4
5
6
7
8
D1.D6. I1.I6. J1.J6
E1,E6
J1.J6
D1,D6
I1,I6
E1.E6. D1.D6. J1.J6
K1,K6
E1,E6
A2.A3.L2.L3
A2.A3
G2.G3.A2.A3
G2.G3
17
18
19
20
21
22
23
24
L1.L6. K1.K6. F1.F6
A1,A6
L1.L6
F1,F6
K1,K6
A1.A6. F1.F6. L1.L6
G1,G6
A1,A6
C2.C3.H2.H3
C2.C3
I2.I3.C2.C3
I2.I3
33
34
35
36
37
38
39
40
P
T

PRESSURE SWING ADSORPTION PROCESS

BACKGROUND OF THE INVENTION

The invention relates to processes and apparatuses for separation of gaseous components by means of selective and adiabatic adsorption and desorption of usually considered unwanted impurities, using suitable adsorbents. The processes concerned are commonly known under the name pressure swing adsorption. Many different systems have been described in the patent literature, all characterized by the general feature that removal of at least one impurifying component is effected through selective adsorption at high pressure by at least one type of adsorbent, densely packed in a pressure vessel, called adsorber. During the adsorption step, feed gas is introduced at the inlet end of the adsorber, producing what is called primary product at the outlet end thereof. Dependent on the feed gas composition, adsorbers may contain more than one type of adsorbent, packed in different vertical zones on top of one another. Types of adsorbents, commonly used in the art may include zeolitic molecular sieves, activated carbon, silica gel or activated alumina.

The indications cocurrent and countercurrent, used hereafter in the description of the various process steps are related to the direction of feed gas flow inside the adsorbers during the adsorption step.

The adsorbents are regenerated by desorbing components through counter-current depressurization until the lowest pressure, producing what is called dump gas and by countercurrent purging at the lowest pressure with near product quality gas, producing purge offgas.

After adsorption, additional near product quality gas of lower pressure is recovered, hereafter called secondary product gas, by depressurizing the adsorber co-currently with the feed inlet end closed. This gas originates from the total void space in the adsorber and from fractionated desorption from adsorbents therein. Production of said secondary product gas by said cocurrent depressurization is made possible without a significant breakthrough of an adsorption front of an unwanted component, provided the adsorption step is ended early enough.

Final depressurization takes place countercurrently down to the lowest pressure, thereby releasing said dump gas. Such dump gas consists of at least one desorbed component in admixture with some of the product component.

The purging of the adsorbent takes place at the preferably lowest pressure by a countercurrent flow through it of purge gas, being a part of said secondary product gas, which thereafter, enriched with at least one desorbed component is collected as said purge offgas.

The combined streams of dump gas and purge offgas are discarded as offgas. Repressurization of the adsorber is realized with its inlet end closed, by admission through its outlet end of, (1) the remaining part of said secondary product gas for the hereinafter as such indicated low level repressurization and finally (2) a part the high pressure product gas, available as a split-off thereof, for the hereinafter as such indicated high level repressurization. On reaching the highest pressure, the contained regenerated adsorbents are ready to undergo a new adsorption step.

According to U.S. Pat. No. 3,430,418 to J. L. Wagner, a minimum of four adsorbers is required for a continuous operation, without requiring additional gas storage vessels, such that always at least one of them is used for adsorbing impurities from feed gas, while the adsorbents in the remaining adsorber or adsorbers are undergoing the other process steps of cocurrent and/or countercurrent depressurization, purging and repressurization.

For a given set of process conditions of feed gas composition, feed gas pressure and desirable offgas pressure, while aiming for a maximum product recovery efficiency, a certain optimum can be established with respect to the distribution of the secondary product gas over its reuse for purging and for low level repressurization. Maximum product recovery efficiency is consistent with the lowest possible concentration of the product component in the offgas, a condition which is met by using a restricted amount of purge gas. If the restricted amount of purge gas is sufficient for an adequate degree of adsorbent regeneration, any amount of available secondary product gas in excess of said restricted amount of purge gas should be used in a useful manner. It is one of the subjects of this invention to improve the utilization of said excess for low level adsorber repressurizations.

The effect of using more or less purge gas as clarified by the diagram of FIG. 1, showing the molar concentration of product component in the offgas each adsorber produces during dumping and purging. The value "C" of said concentration is plotted versus the percentage "Q" of the total of such offgas. The composition of the front end of the dump gas, shown at the left hand side of said diagram, is always identical to the composition of the feed gas; as it originates from the void spaces of the inlet end of an adsorber and its connected piping. While dumping continues towards a continuously dropping pressure, the adsorbent's void space releases gas which due to desorption contains more and more impurities, causing the value C to drop. Upon reaching the purging pressure, dumping is stopped. At this point Qd percent of the total offgas which an adsorber releases during a cycle has been produced. The amount indicated between Qd and 100% represents the purge offgas, the concentration of product component therein gradually rises until the available quantity of purge gas has been spent and the purging is finished. This clarifies, that by using less purge gas, less purge offgas is produced, containing less product component as well, consistently resulting in a higher product recovery efficiency. However, a sufficient quantity of purge gas remains required for an effective regeneration of the adsorbents near the outlet end of the adsorbers and to realize a sufficiently large loading difference after the adsorption step consistent with a commercially acceptable utilization of the adsorbents.

By increasing the internal pressure recovery efficiency, defined as pressure rise realized by secondary product gas relative to the pressure rise with total repressurization, then a smaller complementary part of said secondary product gas can be used for purging. One way of achieving a better control over the recovery and the distribution of secondary product gas over low level repressurization and purging is described in U.S. Pat. No. 3,564,816 granted to L. B. Batta. According to this description for a system consisting of 4 adsorbers, the internal pressure recovery efficiency is increased and the proportion of the total recovered quantity of secondary product gas reused for purging is reduced effectively with respect to realizing a higher product recovery efficiency. Increase of the internal pressure recovery efficiency in this system is realized by using the tail end of the released secondary product gas for the initial low level repressurization of an adsorber instead of for continuation of the purging of said adsorber.

Although this method, hereafter indicated as Batta-method, also when used in systems with more than 4 adsorbers, increases the internal pressure recovery and as a result, the product recovery efficiency, the offgas production is interrupted during said first stage of repressurizing, requiring large surge drums to dampen the irregularities of the offgas flow. Furthermore, an increase of the internal pressure recovery may have a limited effect on the product recovery efficiency in such cases, because for such increase, the following parameters are likewise increased: (1) the start-of-dump pressure, (2) the quantity of dump gas, (3) the content of the product component in the dump gas, and therefore (4) product loss. In addition, any such breakthrough of impurities will be at its maximum at said increased start-of-dump pressure and since the recovered secondary product gas is used for countercurrent low level repressurization of an adsorber, these impurities, due to the shortened range until the highest pressure is reached, will become re-adsorbed at a final position more close to the product end of said adsorber. Moreover, due to said shortened range, the magnitude of said re-adsorption will be less, leaving more of said impurities in the gaseous phase and therefore in the final product. Another way of increasing the internal pressure recovery efficiency and therefore of reusing a lower complementary proportion of secondary product gas for purging, is by increasing the number of participating adsorbers in the process like as described in the aforementioned patent to Batta, using 5 adsorbers and as described in U.S. Pat. No. 3,986,849 to A. Fuderer and E. Rudelsdorfer, using up to 10 adsorbers in the system. Each time when an adsorber is depresurrized by the cocurrent release of secondary product gas, such gas is distributed over more than one adsorber until for each next adsorber receiving such gas at a lower pressure level, equilibration is attained. In addition, the last portion of the released secondary product gas could be reused for low level repressurization instead of for purging as aforementioned for the Batta invention, however with the adverse effects of offgas flow interruption and of the increased start-of-dump pressure.

Still another invention is described in U.S. Pat. No. 4,350,500 to A. J. Esselink on the improvement of the internal pressure recovery efficiency, as is explained hereafter.

Because product gas is of the highest available pressure and of the highest purity, final repressurization takes place by the product split-off only, hence by high level repressurization. However where the flow rate of the net product should be kept constant, said product split-off should be withdrawn therefrom without interruption, leading to a surplus thereof when said product split-off is not needed for final high level repressurization. In cases where no useful purpose for said surplus other than for repressurization can be considered, said surplus is combined with said secondary product gas which is used for partial low level repressurization until pressure equilibration between two adsorbers, resulting into a higher equilibration pressure than if only secondary product gas had been used until such pressure equilibration. Contrary to the above and in accordance with the aforementioned Esselink invention, combining said product split-off and said secondary product gas is avoided in systems where at least two adsorbers are or will be in the condition of receiving feed gas and where by delaying the moment of switching on a next adsorber to adsorption, the final high level repressurization of this adsorber is likewise made to continue to be finally repressurized by said product split-off in a last stage, thereby eliminating said surplus. Since said product split-off no longer interferes with the pressure equilibration between two adsorbers, the equilibration pressure between said two adsorbers will be lower, causing the remaining part of secondary product to be used for purging to be lower as well. The number of adsorbers L, receiving feed gas in parallel will be at least two, whereby said number is temporarily reduced to L−1 after switching off one of these while the switching on of a regenerated adsorber to adsorption is delayed. During said delay said regenerated adsorber remains to be subjected to high level repressurization while consequently the velocity of the feed gas in the adsorber or adsorbers being switched on but as such in number been reduced by one, is temporarily increased by the ratio L/(L−1), provided the total stream of feed gas remains unchanged; the consequence of using this method of reducing the quantity of purge gas is, that the feed gas velocity in an adsorber for a fixed quantity of feed gas per adsorber varies in accordance with said ratio. Said variance is permitted as explained hereafter.

During adsorption, adsorption and desorption fronts are established inside the adsorbers concerned, marking the extent by which adsorbable components in the gaseous phase are carried along cocurrently with feed gas. Behind said fronts are active zones, known as mass transfer zones, where exchange of adsorbable components between the gaseous and adsorbed phase take place. The heights of these mass transfer zones depend (1), on diffusion parameters, affecting the resistance to mass transfer with respect to the exchange of adsorbable components between the gaseous and adsorbed phase, (2), on the driving forces for adsorption and desorption, and (3), on the feed gas velocity. Increasing or decreasing the feed gas velocity has a corresponding effect on the height of the mass transfer zones.

To achieve an efficient utilization of the adsorbent, the heights of the mass transfer zones should be small at the moment in time when adsorption and desorption fronts are no longer advancing, which is at the end of the cocurrent depressurization. Well ahead of said moment, the velocity of the cocurrent gas flow should be kept small, such that the heights of the mass transfer zones are allowed sufficient time to become correspondingly small towards said moment, as if no prior periods of higher gas velocities had existed. Because gas velocities during cocurrent depressurization will be almost zero near to the closed feed inlet end, the period for lower gas velocities affecting adsorption and desorption fronts, if more near to said feed inlet end, should preferably be chosen well ahead of the start of the cocurrent depressurization and therefore while still in the adsorption stage.

Therefore, without effect on the final adsorber conditions with respect to adsorbent loadings and adsorbate distribution between gaseous and solid phases, the adsorber feed gas velocity may be higher during a certain interval of time, provided said velocity is reduced again to a lower level, in general well ahead of the end of the adsorption step.

SUMMARY OF THE INVENTION

Surprisingly, it has been found that the internal pressure recovery efficiency can be significantly improved by implementing, during a part of said delay, an additional pressure equilibration, between said regenerated adsorbed and said switched off adsorber while the latter releases secondary product gas in a first stage, supplementary to the product split-off for repressurizing said regenerated adsorber. The high level repressurization is thereby divided into two stages, as such being considered a part of this invention. By practicing this invention under circumstances where the increase of the internal pressure recovery is beneficial, a significant improvement of the product recovery efficiency of 2% to 3% becomes feasible.

DETAILED DESCRIPTION OF PREFERRED EMBODIMENTS

Brief Description of the Drawings:

FIGS. 19*a*. and 19*b*. are cycle diagrams illustrating yet another embodiment of the invention;

FIGS. 21*a*. and 21*b*. are cycle diagrams illustrating yet another embodiment of the invention;

The improvements and advantages of this invention and the differences with prior art are explained by comparing internal pressure recoveries of the following five examples.

In said five examples, pressure versus time diagrams are shown, each covering one cycle element. Instead of covering a time span over a complete cycle, such cycle is cut into a number of identical cycle elements equal to the number of adsorbers. In said diagram all the consecutive functions of adsorbers within the time span of a cycle element are shown, by tracking a line representing some function starting at the left to the right and then re-entering the diagram again at the left at the same pressure, whereby the new line represents either the next or the same function as the case may be.

EXAMPLE 1

Figure 2:
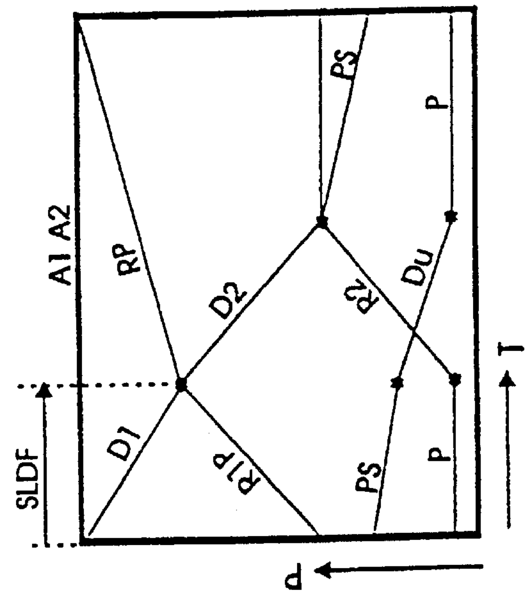

FIG. 2, representing one cycle element, shows the pressures in a pressure swing adsorption unit of prior art. The proper sequence of the consecutive functions for each adsorber is: A1, A2, D1, D2, PS, Du, P, R2, R1P, RP, etc. Specifically, said functions are, A1 and A2 for adsorption, three for cocurrent depressurization, (1): D1, equilibrating with R1P at a first equilibrium pressure, (2): D2, equilibrating with R2 at a second equilibrium pressure, (3): PS, for purgegas supply to purge P, one for dumping Du, one for purging P, and three for repressurization, (1): R2, equilibrating with D2 at said second equilibrium pressure, followed by isolation until (2): R1P, low level repressurization, equilibrating with D1 at said first equilibrium pressure, combined with high level repressurization, (3): RP: high level repressurization until the highest pressure is achieved, after which function A1 starts. The position in the diagram where D1 and R1P are reaching pressure equilibrium and where RP, the final high level repressurization should start, is indicated by the term SLDF. It indicates the fraction of the cycle element time during which low level and high level repressurization are taking place simultaneously.

EXAMPLE 2

Figure 3:
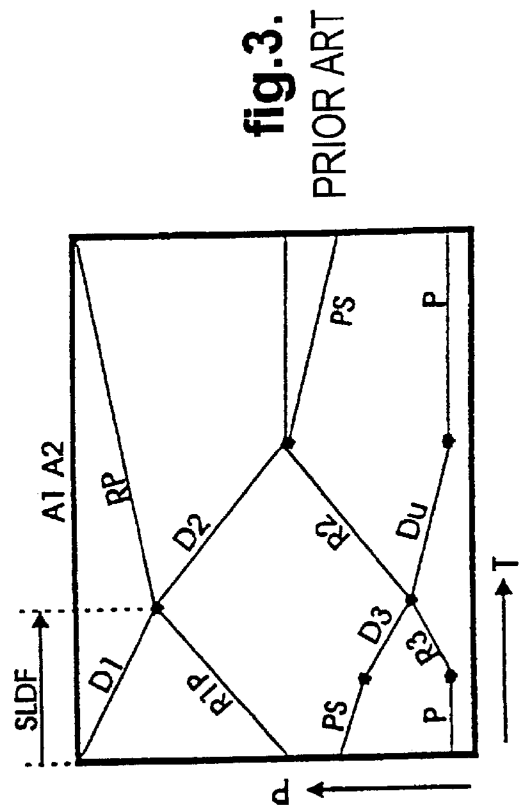
FIGS. 2 and 3 comprise cycle diagrams according to the prior art.

FIG. 3, representing one cycle element, shows the pressures in a pressure swing adsorption unit, also of prior art with an increased internal pressure recovery, similar to the system as described for four adsorbers in the aforementioned Batta patent. The sequence of the consecutive functions for each adsorber is: A1, A2, D1, D2, PS, D3, Du, P, R3, R2, R1P, RP, etc. Specifically, said functions are, A1 and A2 for adsorption, four for cocurrent depressurization, (1): D1, equilibrating with R1P at a first equilibrium pressure, (2): D2, equilibrating with R2 at a second equilibrium pressure, (3): PS, for purge gas supply to purge P, (4): D3, equilibrating with R3 to a third equilibrium pressure, one for dumping Du, one for purging P, and four for repressurization, (1): R3, equilibrating with D3 to said third equilibrium pressure, (2): R2, equilibrating with D2 to said second equilibrium pressure, followed by isolation until (3): R1P, low level repressurization and equilibrating with D1 at said first equilibrium pressure combined with high level repressurization and (4): RP, final high-level-only-repressurization, until the highest pressure is attained, after which function A1 starts. During the low level repressurization R3 by D3, one of the typical process steps according to the Batta invention, the offgas flow is interrupted.

EXAMPLE 3

In this example, the internal pressure recovery is increased by the reduction by one of the number of adsorbers being simultaneously subjected to adsorption. The parameter by which this process variable is described, is defined as sorption modulation, hereinafter indicated by the term SM. The magnitude of this parameter represents the fraction of the cycle element time during which said reduction is applied.

Figure 4:
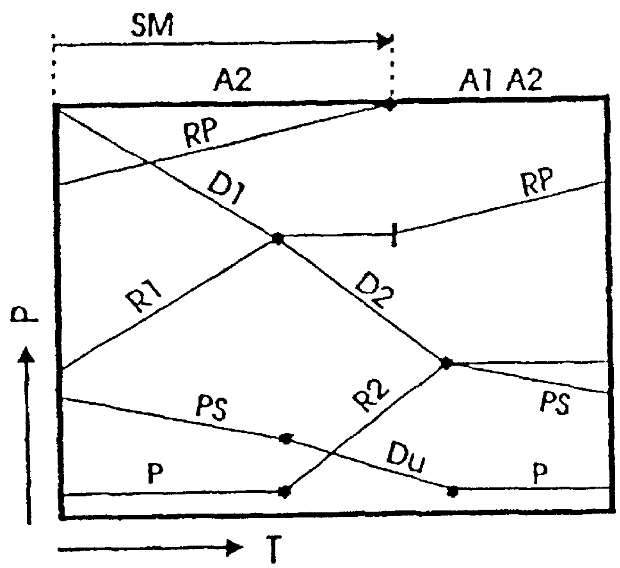
FIGS. 4–6 comprise cycle diagrams according to an embodiment of the present invention.

A cycle element in FIG. 4 shows all the consecutive functions of which the proper sequence is: A1, A2, D1, D2, PS, Du, P, R2, R1, RP, etc. Specifically, said functions are, A2 for adsorption during the cycle element fraction SM, followed by A1 and A2 for adsorption, three for cocurrent depressurization, (1): D1, equilibrating with R1 at a first equilibrium pressure, (2): D2, equilibrating with R2 at a second equilibrium pressure, (3): PS for purge gas supply to purge P, one for dumping Du, one for purging P and three for countercurrent repressurization (1): R2, equilibrating with D2 to said second equilibrium pressure, followed isolation until the end of the cycle element, (2): R1, equilibrating with D1 at said first equilibrium pressure, possibly followed by a brief isolation, (3): RP, high level repressurization, until the highest pressure is attained at the cycle element fraction SM, after which function A1 starts.

EXAMPLE 4

Under the condition where sorption modulation is applied, a further increase of the internal pressure recovery is realized by an additional pressure equilibration. The parameter by which this process variable is described, is indicated hereinafter by the term SMEQ. The magnitude of this parameter represents the fraction of the cycle element time during which the adsorber, after a period of only high level repressurization, in addition at the start of the next cycle element is subjected to low level repressurization until pressure equilibration. After this, the high-level-only-repressurization is continued until the highest pressure is attained at the value SM. Consequently, the high-level-only-repressurization is divided into two stages.

Figure 5:
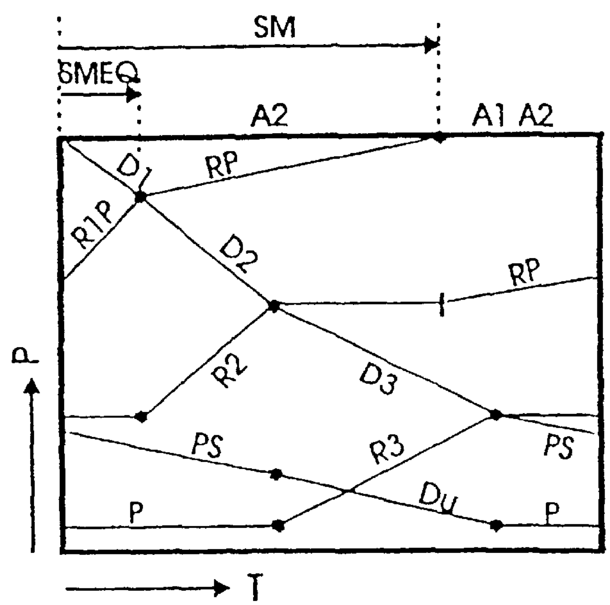

A cycle element in FIG. 5 shows all the sequential functions for each adsorber: A1, A2, D1, D2, D3, PS, Du, P, R3, R2, RP, R1P, RP, etc. Specifically, said functions are, A1 and A2 for adsorption, four for cocurrent depressurization (1): D1, equilibrating with R1P at a first equilibrium pressure, (2): D2, equilibrating with R2 at the second equilibrium pressure, (3): D3, equilibrating with R3 at the third equilibrium pressure, (4): PS, for purge gas supply to purge P, one for dumping Du, one for purging P, five for repressurization, (1): R3, equilibrating with D3 at said third equilibrium pressure, (2): R2, equilibrating with D2 at said second equilibrium pressure, followed by isolation until cycle element fraction SM, (3): RP, high-level-only-repressurization for the remaining part of the cycle element, (4): R1P, equilibrating with D1 at said first equilibrium pressure at the value SMEQ, combined with high level repressurization, (5): RP, the final high-level-only-repressurization until the highest pressure is attained at the value SM, after which function A1 starts.

EXAMPLE 5

This example is a combination of examples 2 and 4, using the increased internal pressure recovery similar to the aforementioned Batta invention based on four adsorbers and as explained in example 2 and the additional increase of the internal pressure recovery according to this invention and as explained in the previous example 4.

Figure 6:
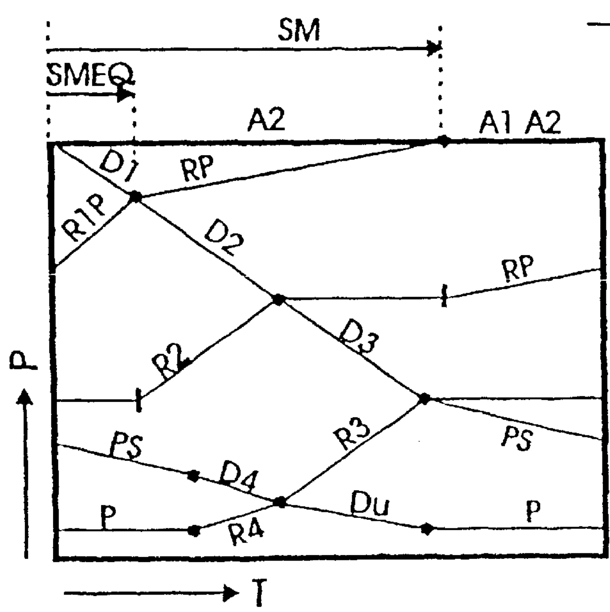

A cycle element in FIG. 6 shows all the sequential functions for each adsorber: A1, A2, D1, D2, D3, PS, D4, Du, P, R4, R3, R2, RP, R1P, RP, etc. Specifically, said functions are, initially A2 for adsorption during the cycle element fraction SM, followed by A1 and A2 for adsorption, five for cocurrent depressurization, i.e. (1): D1, equilibrating with R1P at cycle element fraction SMEQ at the first equilibrium pressure, (2): D2, equilibrating with R2 at the second equilibrium pressure, (3): D3, equilibrating at the third equilibrium pressure, (4): PS; fur purge gas supply; (5): D4, for equilibrating with R4 at the fourth equilibrium pressure, Du for dumping, P for purging, six for repressurization, i.e. (1), R4, for equilibrating with D4 at said fourth equilibrium pressure, (2): R3, for equilibrating with D3 at said third equilibrium pressure, followed by isolation which continues into the next cycle element until the value SMEQ, (3): R2, equilibrating with D2 at said second equilibrium pressure, followed by isolation until the value SM, (4): RP, the high-level-only-repressurization for the remaining part of the cycle element, (5): R1P, equilibrating with D1 at said first equilibrium pressure at the value SMEQ, combined with high level repressurization, (6): RP, the high-level-only-repressurization until the highest pressure is attained at the value SM, after which function A1 starts.

The internal pressure recoveries of the examples 1 to 5 can be compared to one another on an equal basis by assuming empty adsorber vessels and neglecting adiabatic thermal effects. The following parameters are defined, IPR: the internal pressure recovery, DPN: the nominal number of pressure equilibrations, not including the implementation of the additional pressure equilibration according to this invention, Pf: the feed gas pressure, Pd: the start-of-dump pressure and Pp: the purging pressure.

The percentage values for the internal gas recoveries can be formulated for the given examples, using the corresponding number of the following equations, whereby all the pressures are quoted in kPa absolute:

1: $IPR=100\times(DPN-SLDF)/(DPN-SLDF+1)$

2: $IPR=100\times[Pd-Pp+(Pf-Pd)\times(DPN-SLDF)/(DPN-SLDF+1)]/(Pf-Pp)$

3: $IPR=100\times DPN/(DPN+1)$

4: $IPR=100\times(SM-SMEQ+DPN)/(SM-SMEQ+DPN+1)$

5: $IPR=100\times[Pd-Pp+(Pf-Pd)\times(SM-SMEQ+DPN)/(SM-SMEQ+DPN+1)]/(Pf-Pp)$

Some results based on the examples 1 to 5 are summarized in Table 1, where n.r. stands for Not Relevant and n.a. for Not Applicable.

TABLE 1

| Example Nr. | 1 | 2 | 3 | 4 | 5 |
|---|---|---|---|---|---|
| Equation Nr. | 1 | 2 | 3 | 4 | 5 |
| DPN | 2 | 2 | 2 | 2 | 2 |
| Pf (kPa) | n.r. | 2600 | n.r. | n.r. | 2600 |
| Pd (kPa) | n.r. | 450 | n.r. | n.r. | 450 |
| Pp (kpa) | n.r. | 150 | n.r. | n.r. | 150 |
| SLDF/SMEQ (–) | 0.18 | 0.20 | 0.00 | 0.15 | 0.15 |
| SM (–) | n.a. | n.a. | 0.60 | 0.75 | 0.75 |
| Offgas Interruption | no | yes | no | no | yes |
| IPR (%) | 64.54 | 68.66 | 66.67 | 72.22 | 75.62 |

Comparing examples 1 and 4, as well as examples 2 and 5, learns that introducing an additional pressure equilibration in accordance with the present invention results into a substantial increase of the internal pressure recovery. The differences between examples 1 and 2, as well as between examples 4 and 5, showing the contribution in terms of internal pressure recovery in accordance with the aforementioned Batta invention, appear to be considerably less and in terms of offgas continuity and of higher start-of-dump pressures also less attractive. Example 3 refers to the aforementioned Esselink invention using the principle of sorption modulation. Sorption modulation SM as applied in the preceeding example 3, with or without an additional pressure equalization SMEQ as applied in the preceding examples 4 and 5, requires a minimum of two adsorbers potentially being simultaneously subjected to adsorption. Depending on the required capacity of a pressure swing adsorption unit the choice on the total number of adsorbers may be 4 for the smaller, and up to 12 for the largest units. If the value of SM approaches 1, either with or without option SMEQ, the number of adsorbers actually being subjected to adsorption likewise approaches the condition of remaining unchanged. In any case, using option SMEQ means the addition of an extra pressure equilibrium.

Purging is most effective at low pressure, facilitating desorption and increasing the sweeping volume of the purge gas. However, the selection of a low purging pressure is not advantageous if the resulting low pressure offgas cannot be used directly in the usual way as fuelgas but needs to be compressed before it can be admitted into an existing higher pressure fuelgas grid, therefore, in order to avoid the necessity of compressing the offgas, a higher purging pressure may be selected.

A higher purging pressure has a number of consequences, like, a higher start-of-dump pressure, a shorter range for cocurrent relative depressurization, a lower degree of desorption at the start and at the end of dumping, a lower concentration of the impurities in the gaseous phase in the adsorbent void space and complementary to this a higher concentration therein of the product component and a higher loss of said product component during the subsequent dumping step, as well as during the purging step thereafter.

Figure 7:
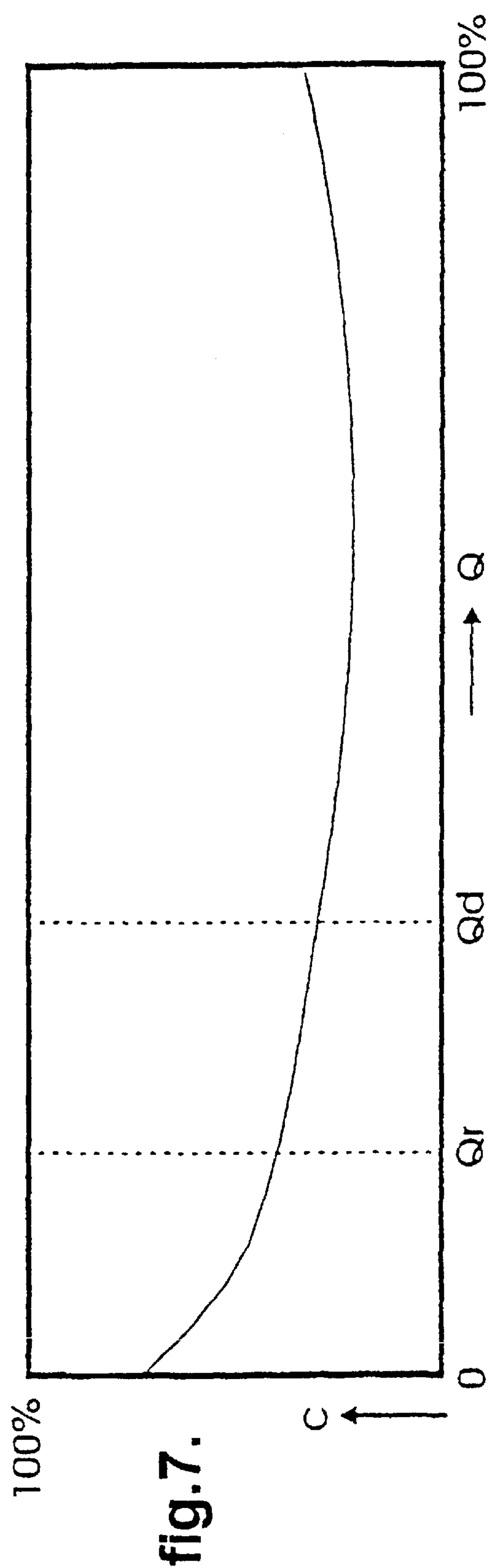
FIGS. 7–9 are concentration diagrams according to the present invention.

The effect of a higher purging pressure is shown by comparing the two diagrams of the FIGS. 1 and 7, giving the offgas profiles as explained above with respect to FIG. 1. The diagram of FIG. 7 represents a case of a relatively high purging pressure. On closer examination of the composition profiles of dump gas and purge offgas and of the effect of a higher purge pressure, it turns out that the minimum value of the concentration "C" of the product component appears to be higher, while this concentration appears to be lower in the tail end of the offgas. This more or less flat profile of the purge offgas is due to the lower degree of desorption.

Surprisingly, it has been found that the product recovery efficiency when using a relatively high purge gas pressure, may be increased by admitting dump gas into a regenerated adsorber via its inlet end with its outlet end being closed, and so realizing initial repressurization. Said repressurization takes place in cocurrent instead of in the usual countercurrent direction, possibly until pressure equilibration is reached. By using this technique, hereinafter indicated as dump return, the part of dump gas with the highest concentration of product component is returned into the system instead of being released as part of the offgas. For achieving an improvement of the product recovery efficiency, it is necessary that the average concentration of product component in the part of dump gas being returned should be noticeably higher than in the remaining part of the total of dump gas and purge offgas. The concentration of the product component in the tail end part of the purge offgas should have a rather flat profile and should not be appreciably higher than its minimum in the offgas.

Figure 1:
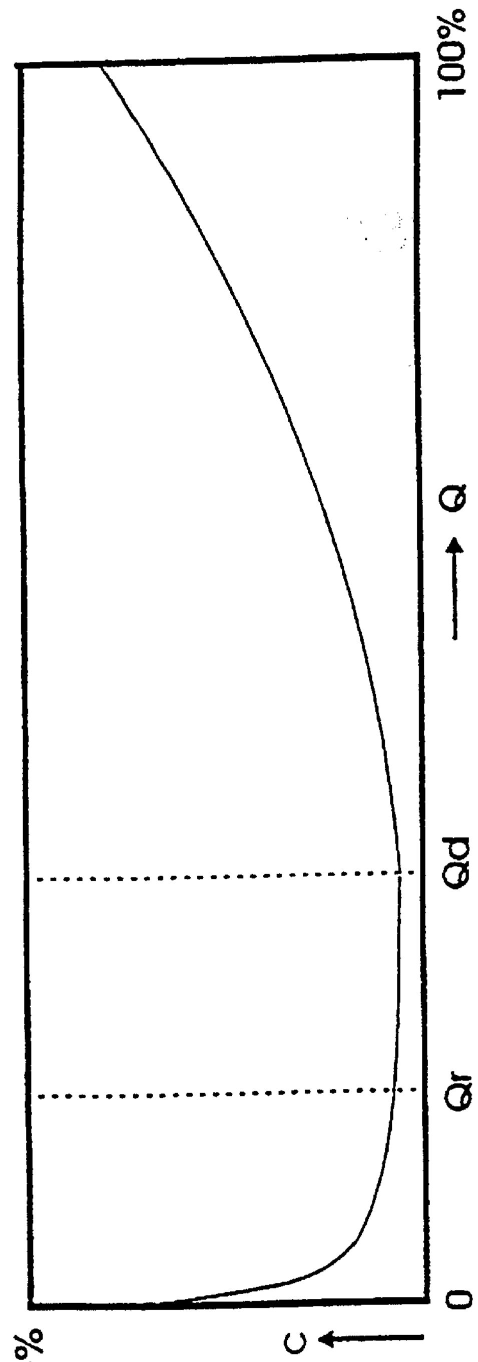
FIG. 1 is a concentration diagram according to the prior art.
Figure 8:
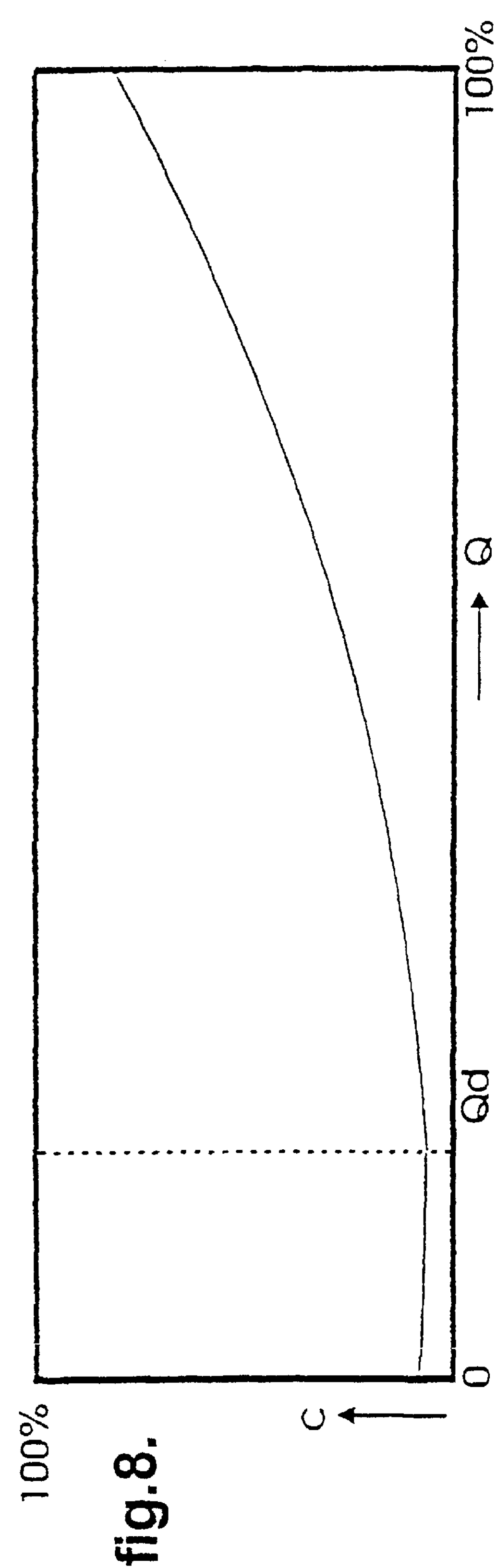

The effect of dump return on the product recovery efficiency in a negative sense, but also in a positive sense can be clearly demonstrated by comparing to one another the diagrams of FIGS. 1 and 8. In case of a relatively low purge pressure, the FIGS. 1 and 8 may serve to explain said effect in the negative sense. The diagram of FIG. 8 is almost equivalent to the diagram of FIG. 1, except for the absence of the returned part of the dump gas with a relatively low percentage of product component and equal to Qr % of the total offgas of FIG. 1. Due to the very minor effect of dump return on the composition of the remainder of the offgas, the net effect will be as represented by FIG. 8, consistent with an average higher percentage of product component in the total offgas and therefore with the lower product recovery efficiency.

Figure 9:
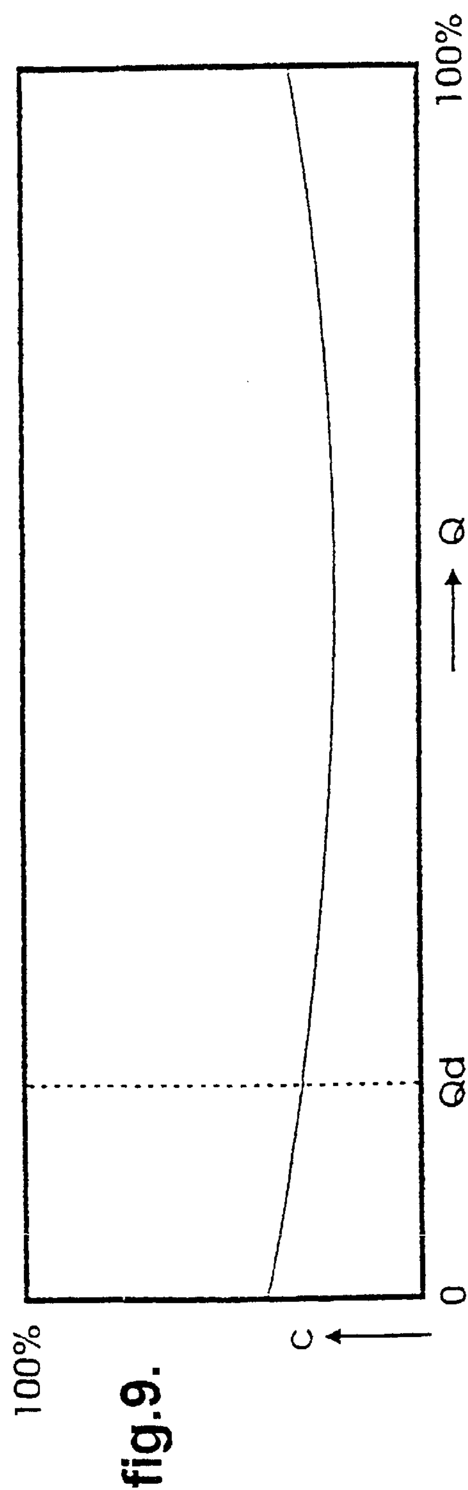

The FIGS. 7 and 9 show offgas profiles when using a relatively high offgas pressure, FIG. 9 presenting the profile of the net offgas after subtracting the recycled part of the dump gas, equal to Qr% of the original offgas of FIG. 7. Dump return in the latter case results into a lower average percentage of product component in the net offgas and therefore into a positive effect on the product recovery efficiency. Whereas the product recovery efficiency may be improved by 1 to 2 percentage points by using dump return, an additional improvement of 1 to 1.5 percentage point is achieved if the use of sorption modulation is included.

In accordance with prior art, the adsorber product outlets in pressure swing adsorption plants are connected with a product collecting header, each via an on/off product collecting valve. The aforementioned product split-off is withdrawn from said product collecting header and via a control valve metered into a second header, which has been provided with separate control valves each of them being connected with an adsorber product outlet, such that the product split-off can be admitted to an adsorber for high level repressurization. Simultaneously, said second header may serve to carry secondary product gas for low level repressurization of an adsorber until pressure equalization has been attained. Therefore, said separate control valves are provided with the necessary means to control their position and with it the flow of secondary product gas through them.

Unexpectedly, it has been found that if, in contrast to said prior art, the product split-off is metered directly from the product collecting header into the product end of an adsorber undergoing high level repressurization, then, (1) the minimum number of required valves is reduced and (2) for plants comprising an assembly of at least seven adsorbers, at least one additional pressure equilibration under the option SMEQ may be realized without requiring additional valves over said reduced minimum number mentioned under (1) above. Said metering of product split-off is realized in countercurrent direction through said product collecting valves in an on/analog/off control function.

An advantage of the provision of an analog control in addition to the on/off function of said product collecting valves, is the possibility of controlling through them the distribution of the constant feed gas flow over adsorbers being subjected to adsorption simultaneously, such that the feed gas velocity inside one of said adsorbers if wanted for achieving a higher loading of the adsorbents therein, may be reduced for a while towards the end of the adsorption step thereof, while the feed gas velocity in the other adsorber or adsorbers being subjected to adsorption simultaneously is permitted to be higher.

It will be clear for those who are familiar with the technical realization of the pressure swing adsorption process, that many ways are possible for application of the principle of sorption modulation, especially if option SMEQ is included. In this respect and more specifically, different possible embodiments of the invention are explained, using illustrations depicting the arrangement of adsorbers and the necessary piping and valves for directing the various gas flows. As a common characteristic for sorption modulation option SMEQ, the number of adsorbers being simultaneously switched on for adsorption vary between L and L−1 whereby, dependent on the unit, L may be minimum two, to maximum four. That further a first adsorber is subjected to high level repressurization: in three phases, (1) between the value SM and the end of a cycle element, (2) between the start and the value SMEQ of the next cycle element, combined with a low level repressurization by secondary product in a first step produced by a second adsorber upon its switching off from adsorption, the latter coinciding with the start of said next cycle element, thereby reducing by one the number of adsorbers simultaneously participating in adsorption, further (3) until the highest pressure is attained at the value SM of said next cycle element and said first adsorber is switched on for adsorption, thereby increasing by one the number of adsorbers simultaneously participating in adsorption. Along with these process steps an additional pressure equilibration is implemented, resulting in an increased product recovery efficiency. Next to the illustrations depicting the arrangement of adsorbers, piping and valves, diagrams show schematically adsorber pressures versus time, covering one complete cycle. The characters and associated numbers, attached to the lines in said diagrams, serve to identify the valves which are open for gas flow control during the indicated time periods, the characters refer to the corresponding adsorbers, and storage vessels where applicable.

Figure 10:
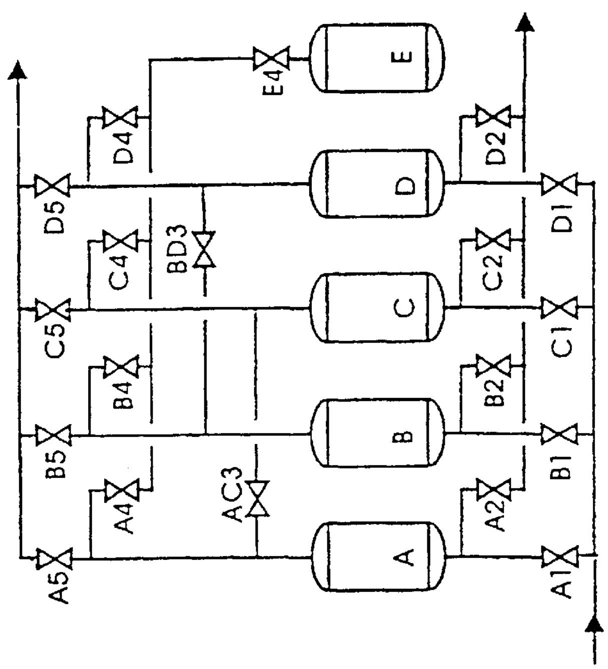
FIG. 10 is a schematic diagram illustrating one embodiment of the present invention.
Figure 11:
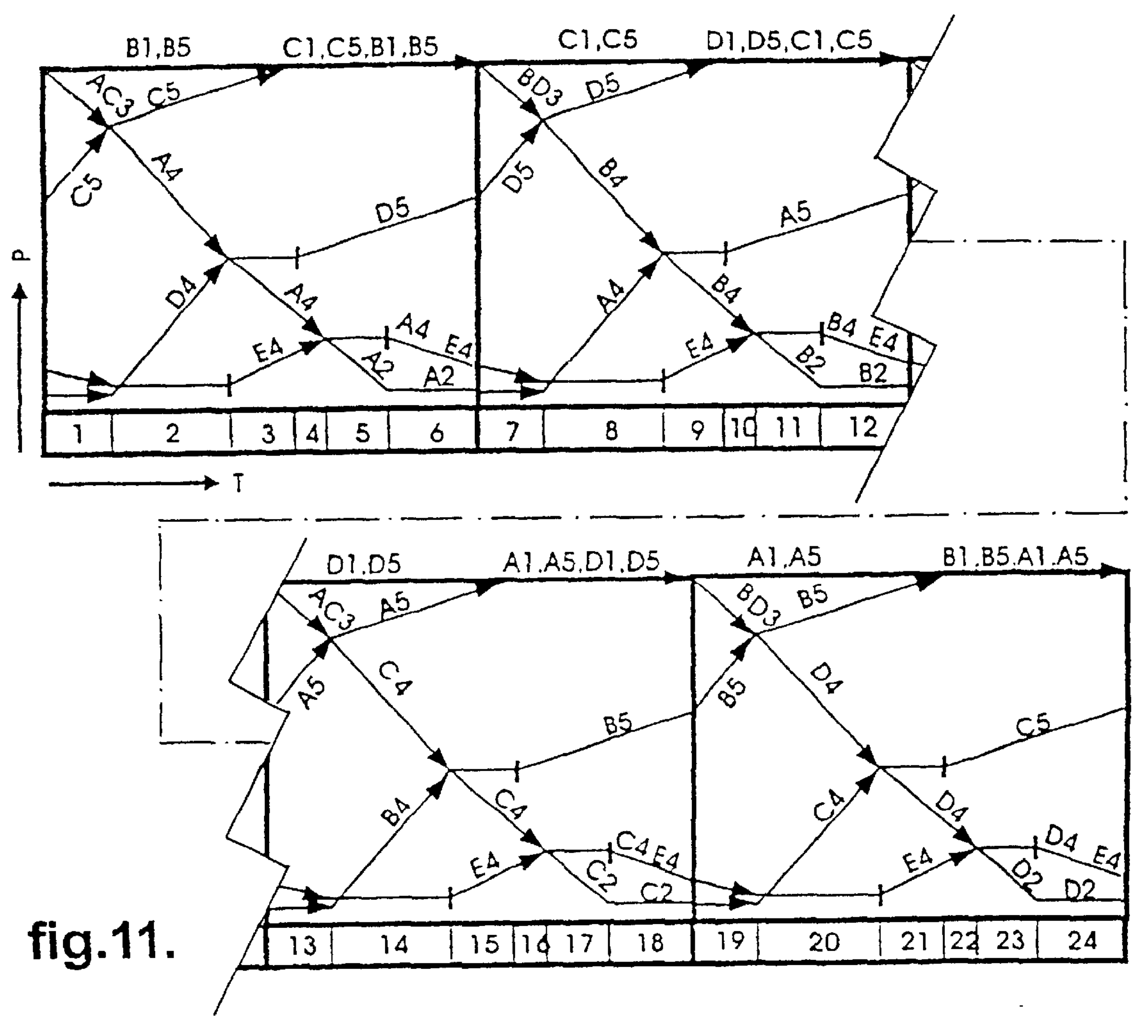
FIG. 11 is a cycle diagram according to another embodiment of the invention.

FIG. 10 shows the embodiment consisting of an assembly of four adsorbers, in alphabetical order indicated by A to D, and a storage vessel E. The secondary product gas after partly being used for repressurization is collected and temporarily stored in vessel E until its use as purge gas. After dumping until the lowest pressure is attained follows purging. The number of pressure equilibrations between adsorbers is two. The third pressure equilibration takes place between storage vessel E and an adsorber releasing a third and last portion of secondary product gas. The start-of-dump pressure equals the level of said third pressure equilibration. FIG. 11 shows the pressure versus time diagram with 6 periods per cycle element. The provision of the additional pressure equilibration is shown in the periods 1, 7, 13, 19, etc., each time dividing the high level repressurization into three stages, whereby during the second stage in addition a low level repressurization, said additional pressure equilibration is effected.

Figure 12:
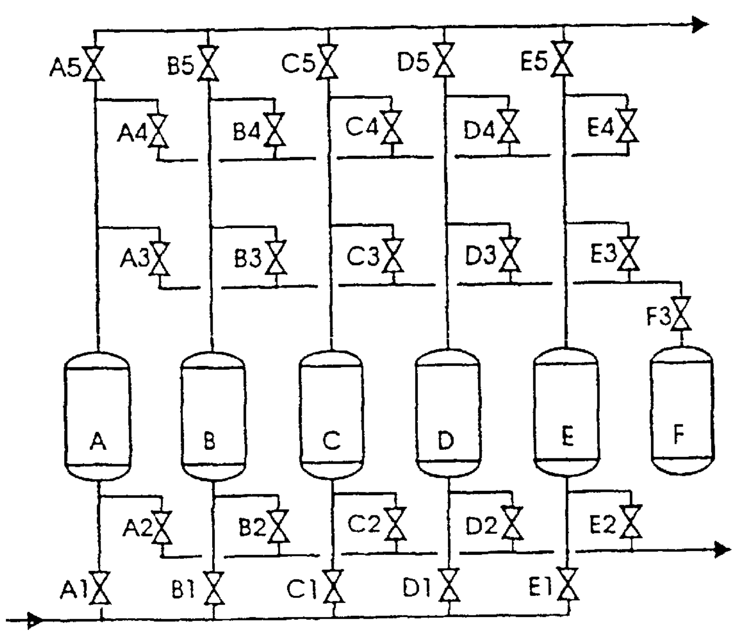
FIG. 12 is a schematic diagram illustrating another embodiment of the invention.
Figure 13:
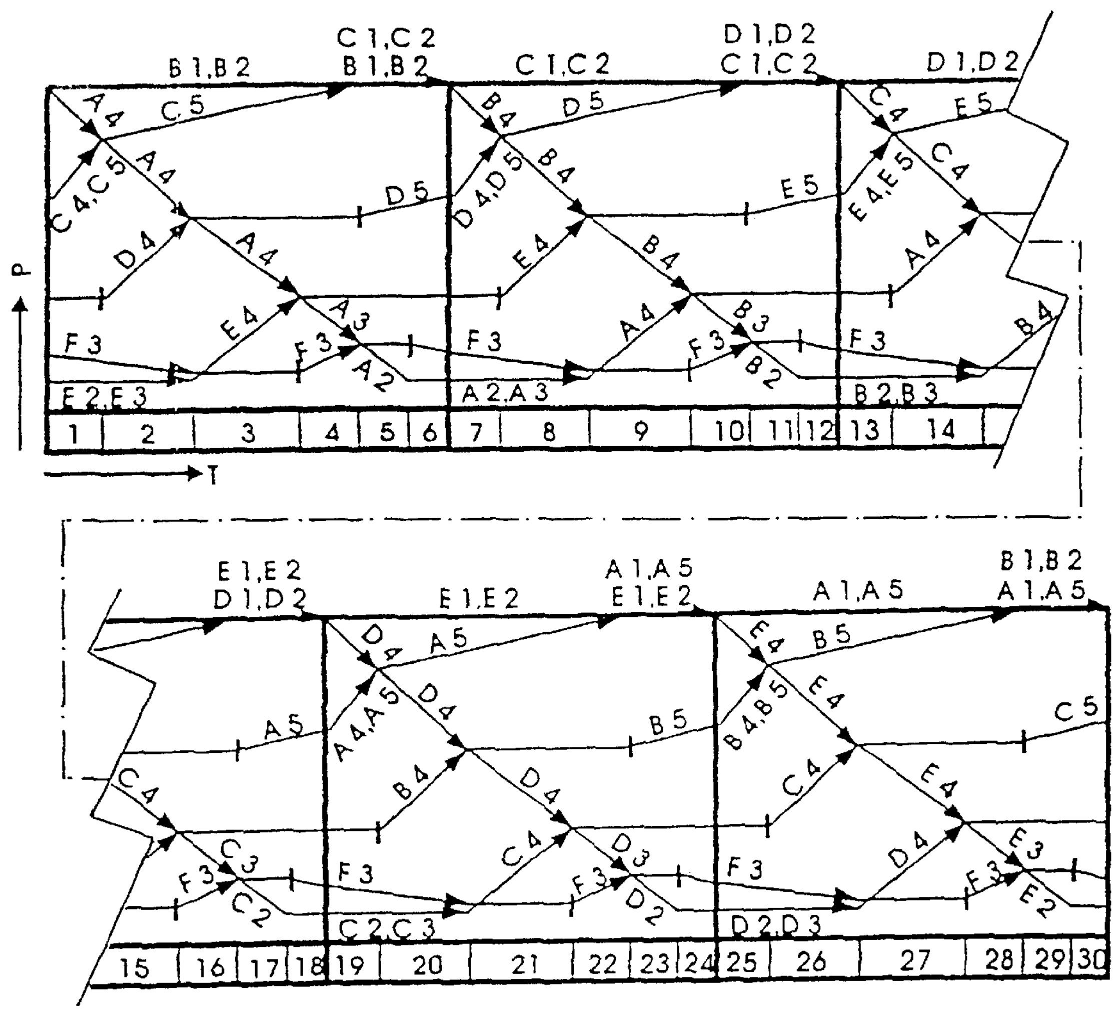
FIG. 13 is a cycle diagram illustrating yet another embodiment of the invention.

FIG. 12 shows the embodiment consisting of an assembly of five adsorbers, in alphabetical order indicated by A to E, and a storage vessel F. The secondary product gas after partly being used for repressurization is collected and temporarily stored in vessel F until its use as purge gas. After-dumping until the lowest pressure is attained follows purging. The total number of pressure equilibrations between adsorbers is three. The fourth pressure equilibration takes place between storage vessel F and an adsorber releasing a fourth and last portion of secondary product gas. The start-of-dump pressure equals the level of said fourth pressure equilibration. FIG. 13 shows the pressure versus time diagram with 6 periods per cycle element. The provision of the additional pressure equilibration is shown in the periods 1, 7, 13, 19, 25, etc., each time dividing the high level repressurization into three stages as in the preceding case for four adsorbers. In TABLE 2, the IPR-values for systems consisting of four and five adsorbers are compared to one another, comprising the aforementioned inventions by Wagner and Batta and this subject invention, showing the improvement for subject invention as described in the FIGS. 10 and 11 for four adsorbers and in the FIGS. 12 and 13 for five adsorbers. It should be noted that the use of sorption modulation in a system consisting of four and five adsorbers a vessel is required for the intermediate storage of secondary product gas for subsequent use as purge gas, in the FIGS. 12 and 13 indicated by vessel E and by vessel F respectively.

An important aspect of the already aforementioned Esselink invention in U.S. Pat. No. 4,350,500 concerns the storage of secondary product in one or more pressure vessels, filled with a nonporous inert packing with a high void fraction, as may be achieved with thin walled metal Raschig rings. Aim of a packing like this is, to preserve the composition profile during said storage by avoiding internal mixing so that on reuse of this gas for the purging of adsorbents and/or the repressurization in an adsorber, the fraction with the highest percentage of impurities, corresponding with the last part recovered secondary product, is used as first part for said reuse. In order to achieve that according to the processes of FIG. 10 and FIG. 12, the sequence of recovery and storage of secondary product in the pressure vessels E, and F respectively, is reversed to the sequence of its reuse as purge gas, said pressure vessels are filled with said packing. In this way, it is achieved that during purging the percentage of impurities in the purge gas drops, i.e. the quality is improved, in the same way this percentage increases during its recovery and storage. Through the possibility of quality improvement of the purge gas during purging, a higher product purity is achieved, at unchanged remaining process conditions.

TABLE 2

| Invention<br>Equation Nr. | Wagner<br>1 | Batta<br>2 | Subject<br>4 | Batta<br>1 | Subject<br>4 |
|---|---|---|---|---|---|
| Number of adsorbers | 4 | 4 | 4 | 5 | 5 |
| DPN | 1 | 1 | 1 | 2 | 2 |
| Pf (kPa) | n.r. | 2600 | n.r. | n.r. | n.r. |
| Pd (kPa) | n.r. | 450 | n.r. | n.r. | n.r. |
| Pp (kPa) | n.r. | 150 | n.r. | n.r. | n.r. |
| SLDF/SMEQ (–) | 0.20 | 0.20 | 0.15 | 0.20 | 0.15 |
| SM (–) | n.a. | n.a. | 0.55 | n.a. | 0.75 |
| Offgas Interruption | no | yes | yes | no | yes |
| IPR (%) | 44.4 | 51.2 | 58.3 | 64.3 | 72.2 |

Figure 14:
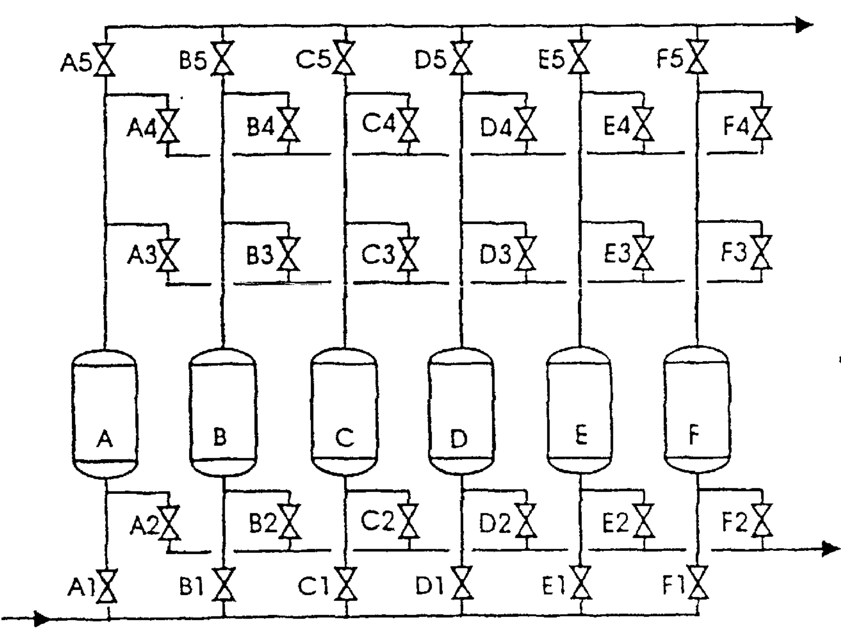
FIG. 14 is a schematic diagram illustrating yet another embodiment of the invention.
Figure 15:
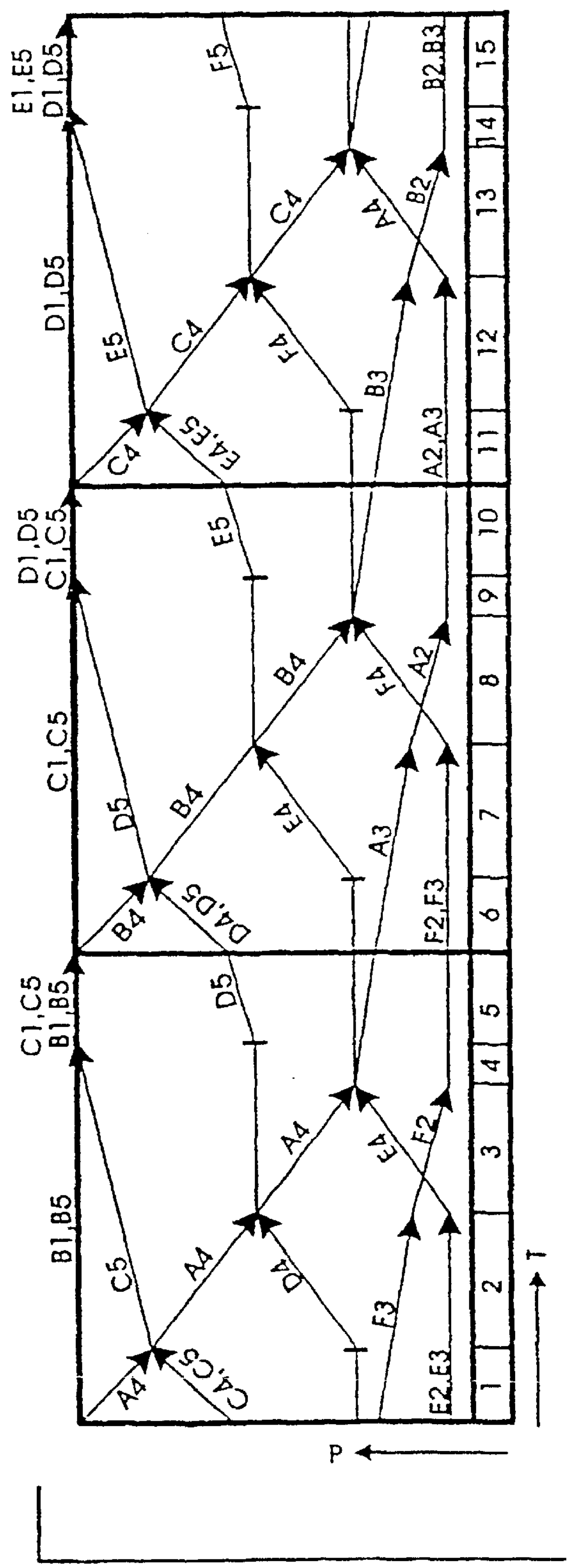
FIG. 15 is a cycle diagram illustrating yet another embodiment of the invention.
Figure 15:
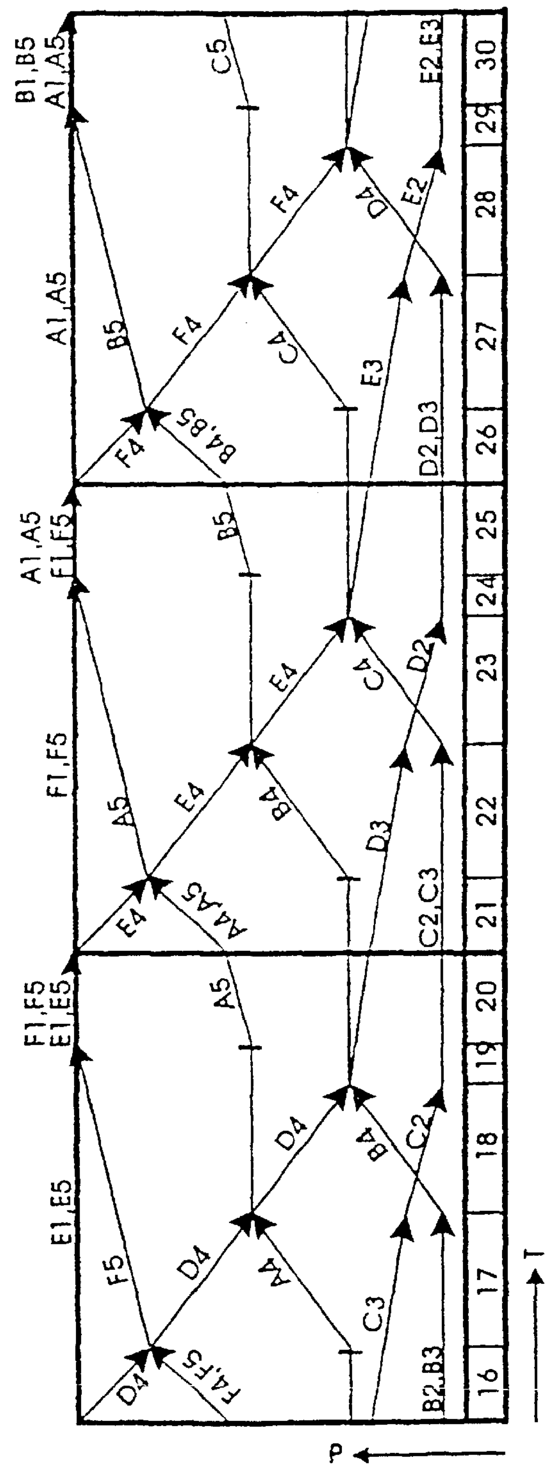

FIG. 14 shows the embodiment consisting of an assembly of six adsorbers in alphabetical order indicated by A to F. The number of pressure equilibrations is three. Compared to the assemblies of four and five adsorbers, subject assembly of six adsorbers does not need a vessel for the temporary storage of purge gas, and the offgas is not interrupted. FIG. 15 shows the pressure versus time diagram with 5 periods per cycle element. The provision of the additional pressure equilibration is shown in the periods 1, 6, 11, 16, 21, 26, etc., each time dividing the high level repressurization into three stages like for instance in the above case comprising four adsorbers. The effect of the additional pressure equilibration, being an increased IPR-value is shown in Table 1 by comparing to one another the examples 1 and 4. A similar effect results for a six-adsorber-system using the Batta-method as shown by comparing to one another the examples 2 and 5.

Figure 16:
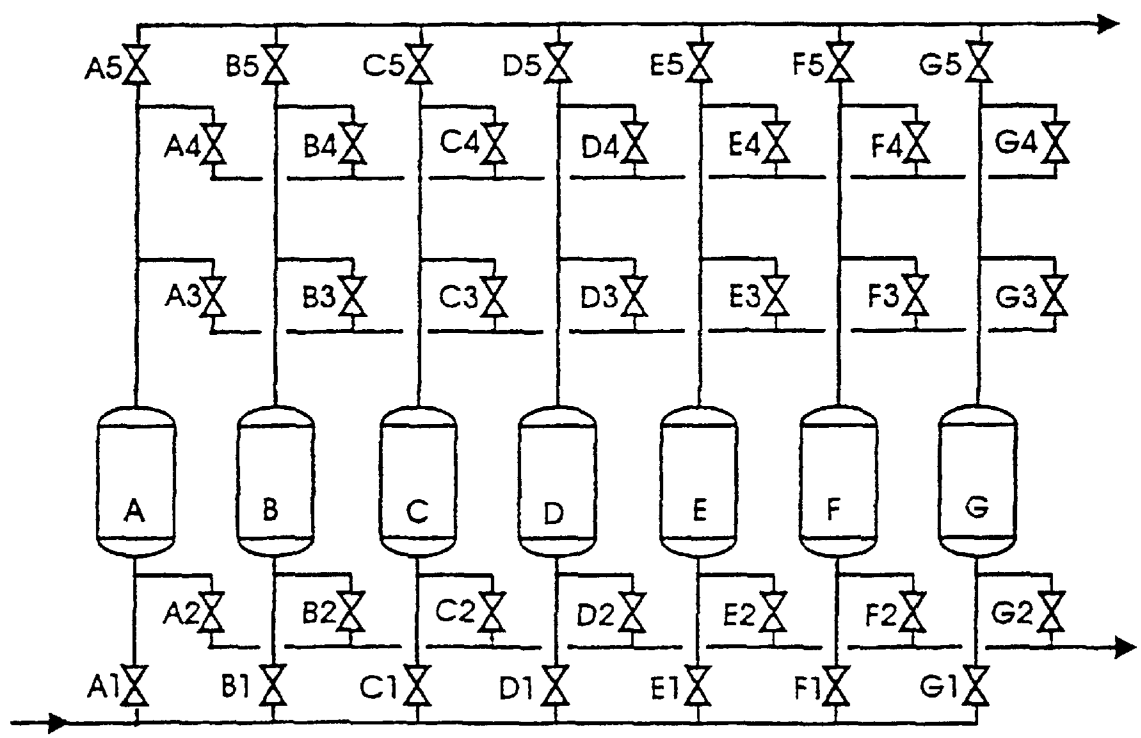
FIG. 16 is a schematic diagram illustrating yet another embodiment of the invention.
Figure 17:
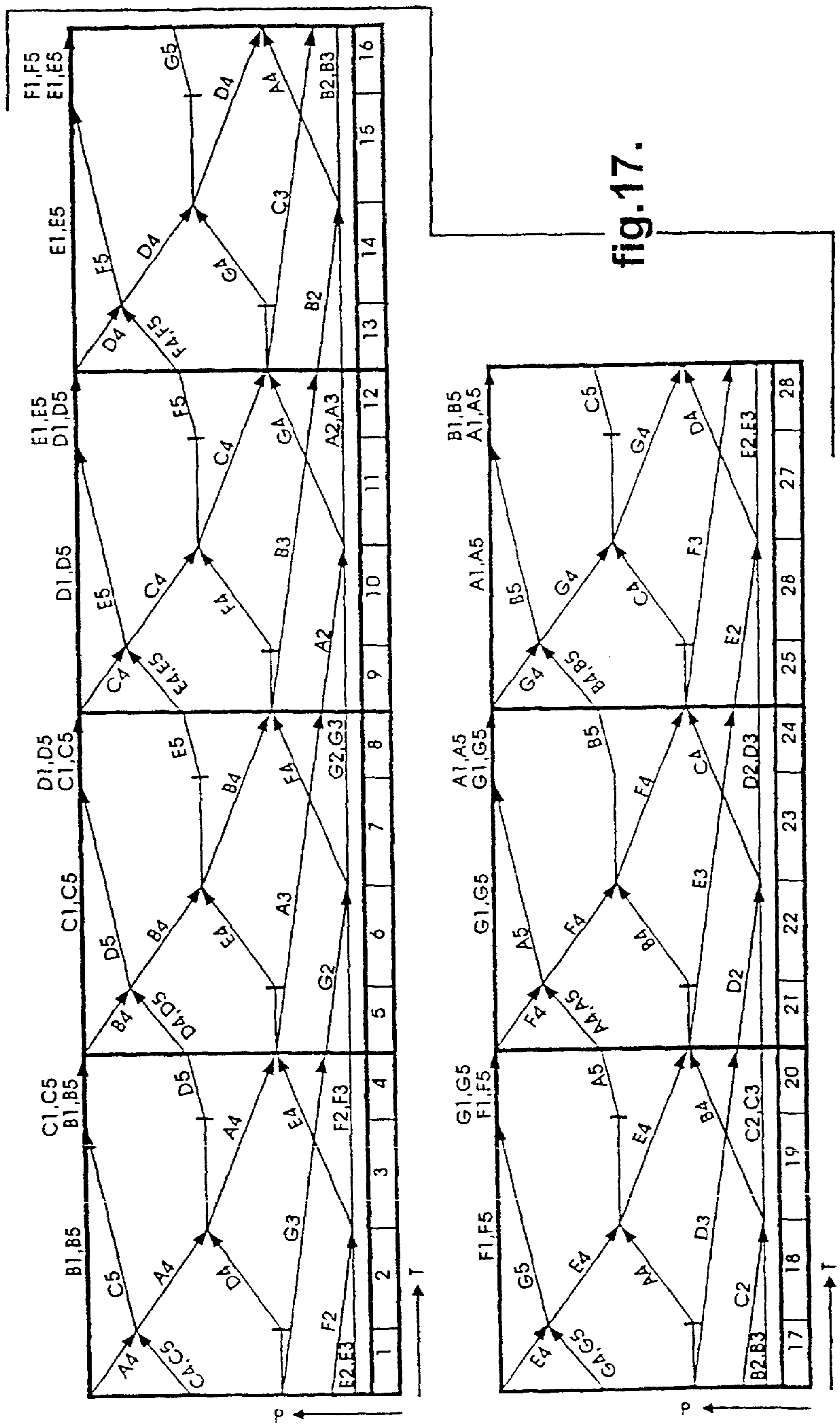
FIG. 17 is a cycle diagram illustrating yet another embodiment of the invention.

FIG. 16 the embodiment is shown, consisting of an assembly of seven adsorbers in alphabetical order indicated by A to G. The nominal plus the additional number of pressure equilibrations is three. Compared to the assembly of six adsorbers of FIG. 14, more time in this subject case is taken for depressurization and purging. FIG. 17 shows the pressure versus time diagram with 4 periods per cycle element. The provision of the additional pressure equilibration is shown in the periods 1, 5, 9, 13, 17, 21, 25, etc., each time dividing the high level repressurization into three stages. Based on the use of the for this case applicable equation 4 for sorption modulation, the IPR-value is: 72.1%, for DPN=2, SM=78% and SMEQ=20%. Compared to prior art in accordance with the aforementioned U.S. Pat. No. 3,986,849, using a 7-adsorber system with DPN=3, not using sorption modulation and not comprising an additional pressure equilibration, the applicable equation 1 reveals an IPR-value of: 71.4% for SLDF=50%. Although the IPR-values are rather similar, the disadvantage of the prior art invention is however that the purge gas has to be withdrawn from the product and that a higher start-of-dump pressure should be used, which leads to a lower product recovery efficiency. An alternative system based on seven adsorbers, not having the disadvantage of the purge gas being withdrawn from the product and not with the necessity of having to use a higher start-of-dump pressure, is characterized by a lower IPR-value of: 63.0, based on DPN=2 and SLDF=30%, based on the for this case applicable equation 1.

Figure 18:
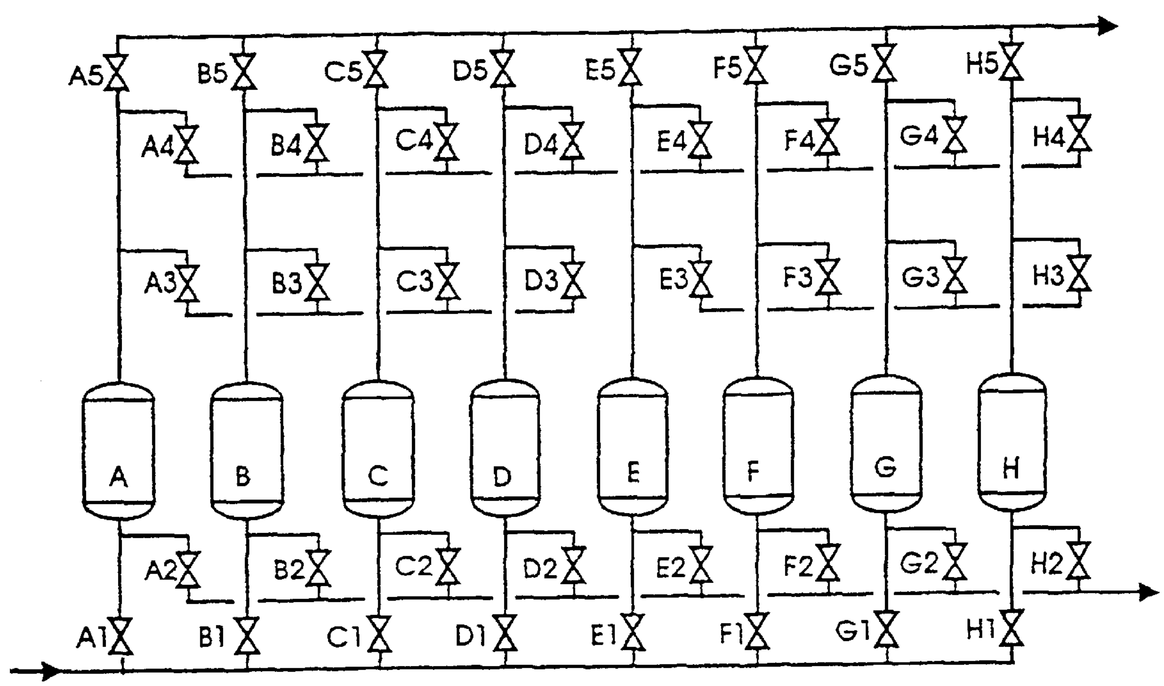
FIG. 18 is a schematic diagram illustrating yet another embodiment of the invention.

FIG. 18 the embodiment is shown of an assembly of eight adsorbers in alphabetical order indicated by A to H. The number of pressure equilibrations is four, however at a fixed start-of-dump pressure. The latter is due to the fact that the last fraction of secondary product gas, following its use for purging, and prior to dumping, is used for the first stage of repressurizing a regenerated adsorber until pressure equilibration. The start-of-dump pressure is thereby fixed at the level of said pressure equilibration. FIG. 19 shows the pressure versus time diagram with 4 periods per cycle element. The provision of the additional pressure equilibration is shown in the periods 1, 5, 9, 13, 17, 21, 25, 29, etc., each time dividing the high level repressurization into three stages. Based on the applicable equation 5 for sorption modulation, the IPR-value is:76.0%, for DPN=2, SM=80%, SMEQ=15%, Pf=2600 kPa, Pd=450 kPa and Pp=150 kPa. This compares very favorably to the prior art as described in the aforementioned U.S. Pat. No. 3,986,849, for which the applicable equation 2 reveals an IPR-value of 64.9% for DPN=2 and SLDF=50% and based on unchanged pressures.

Figure 20:
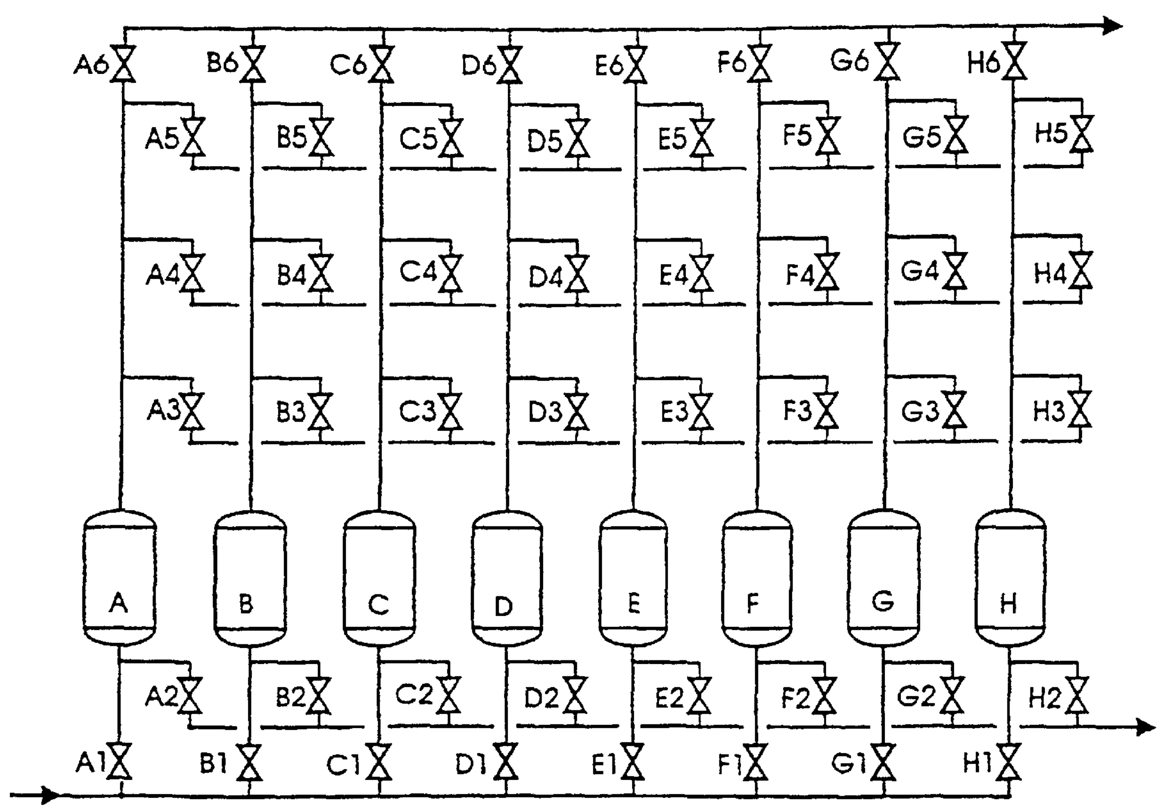
FIG. 20 is a schematic diagram illustrating yet another embodiment of the invention.

FIG. 20 shows the embodiment consisting of an assembly of eight adsorbers in alphabetical order indicated by A to H. Compared to the configuration of FIG. 18, also consisting of eight adsorbers and employing four pressure equilibrations, in this assembly, the last fraction of secondary product gas is used for purging instead of for being used for low level repressurization and therefore leaving the possibility for selecting the start-of-dump pressure independently from the other process parameters. However, this assembly requires one or more valves per adsorber. FIG. 21 shows the pressure versus time diagram with 4 periods per cycle element. The provision of the additional pressure equilibration is shown in the periods 1, 5, 9, 13, 17, 21, 25, 29, etc., each time dividing the high level repressurization into three stages. Based on the use of equation 4 for sorption modulation, the EPR-value is: 78.3%, for DPN=3, SM=80% and SMEQ=20%. Comparing to prior art in accordance with the aforementioned U.S. Pat. No. 3,986,849, using an 8-adsorber system with DPN=4, not using sorption modulation and not comprising an additional pressure equilibration, for this case applicable equation 1 reveals an IPR-value of: 77.8% for SLDF=50%. Although the EPR-values are rather similar, the disadvantage of the prior art invention is however that the purge time is only half of the cycle element time and also only half of the purge time of this invention, which could make the purge step less effective.

Figure 22:
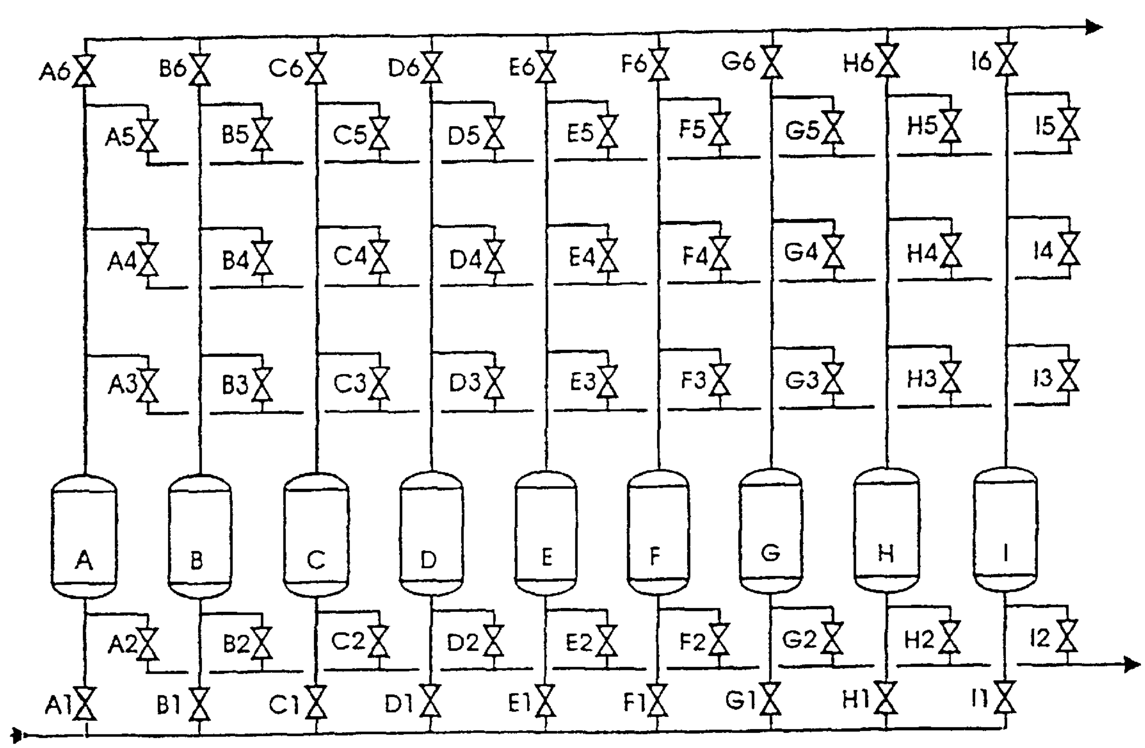
FIG. 22 is a schematic diagram illustrating yet another embodiment of the invention.
Figure 23A:
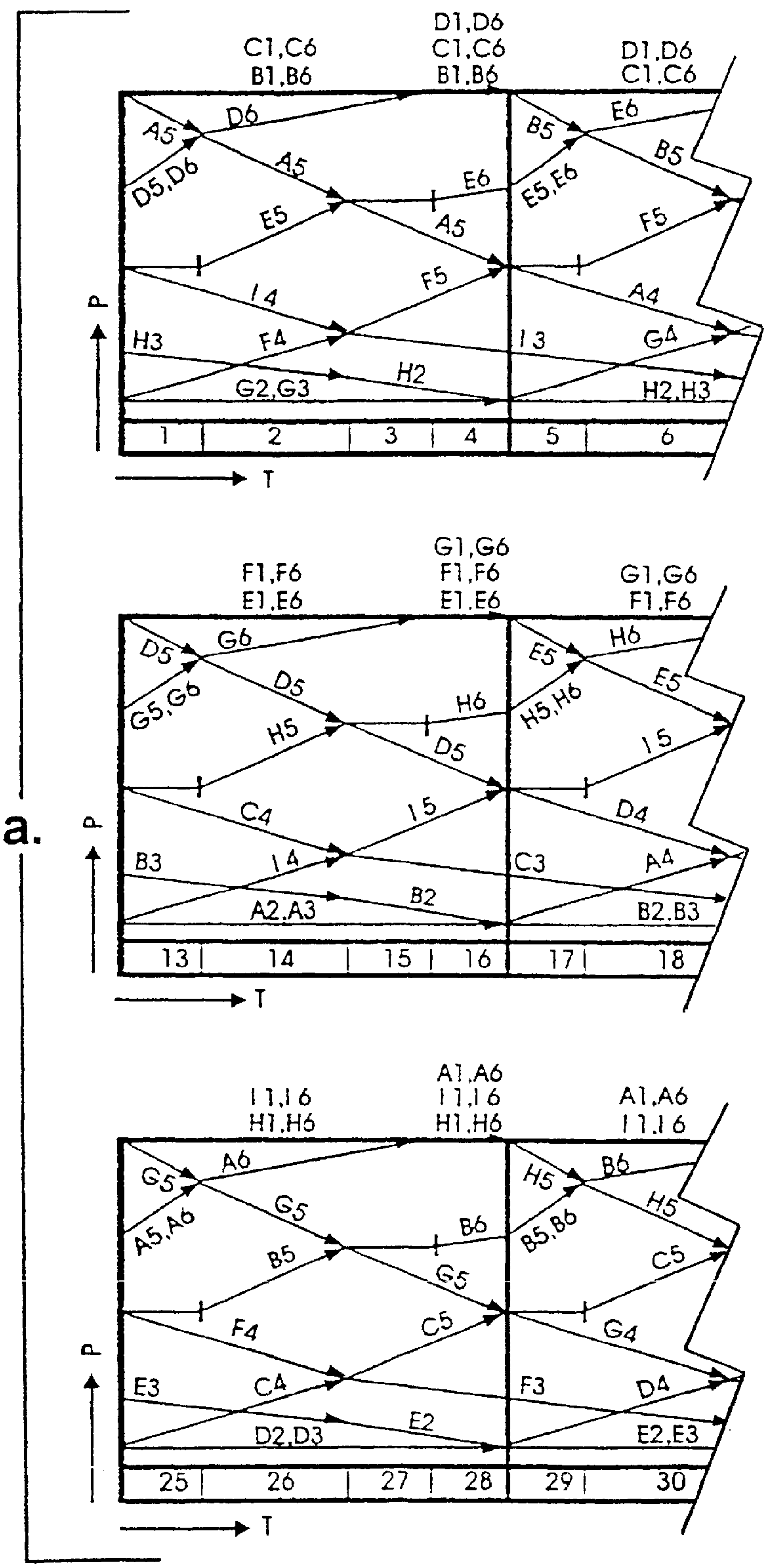
FIGS. 23*a*. and 23*b*. are cycle diagrams illustrating yet another embodiment of the invention.
Figure 23B:
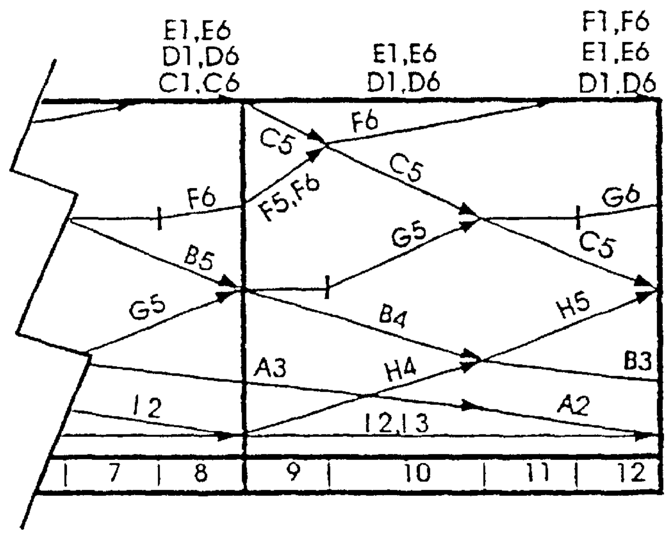
Figure 23B:
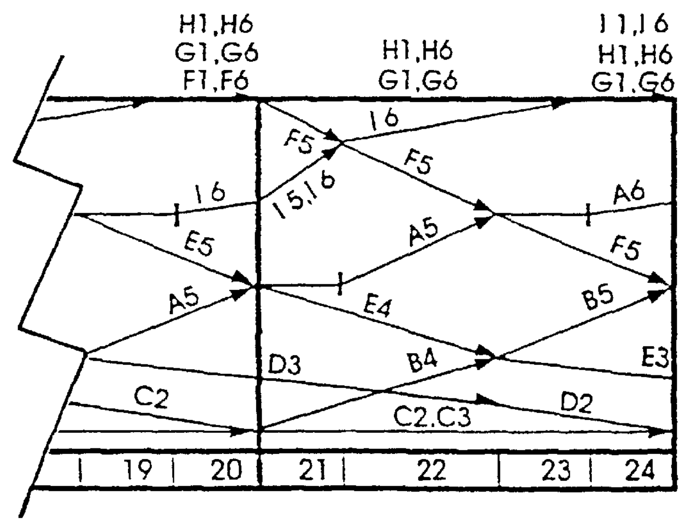
Figure 23B:
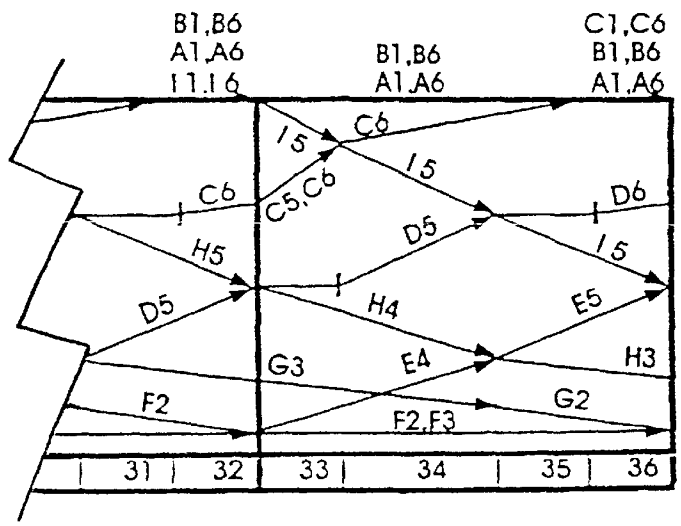

FIG. 22 shows the embodiment consisting of an assembly of nine adsorbers in alphabetical order indicated by A to I. Compared to the assembly of eight adsorbers of FIG. 20, subject assembly of nine adsorbers employs the same number of four pressure equilibrations, the difference being that in this subject case the maximum number of adsorbers simultaneously being subjected to adsorption is three instead of two. FIG. 23 shows the pressure versus time diagram with 4 periods per cycle element. The provision of the additional pressure equilibration is shown in the periods 1, 5, 9, 13, 17, 21, 25, 29, 33, etc., each time dividing the high level repressurization into three stages. Based on the use of equation 4 for sorption modulation, the IPR-value is: 78.3%, for DPN=3%, SM=80% and SMEQ=20%. Comparing to prior art in accordance with the aforementioned U.S. Pat. No. 3,986,849, using a 9-adsorber system with DPN=3, not using sorption modulation and not comprising an additional pressure equilibration, the for this case applicable equation 1 reveals an IPR-value of: 71.4% for SLDF=50%.

Figure 24:
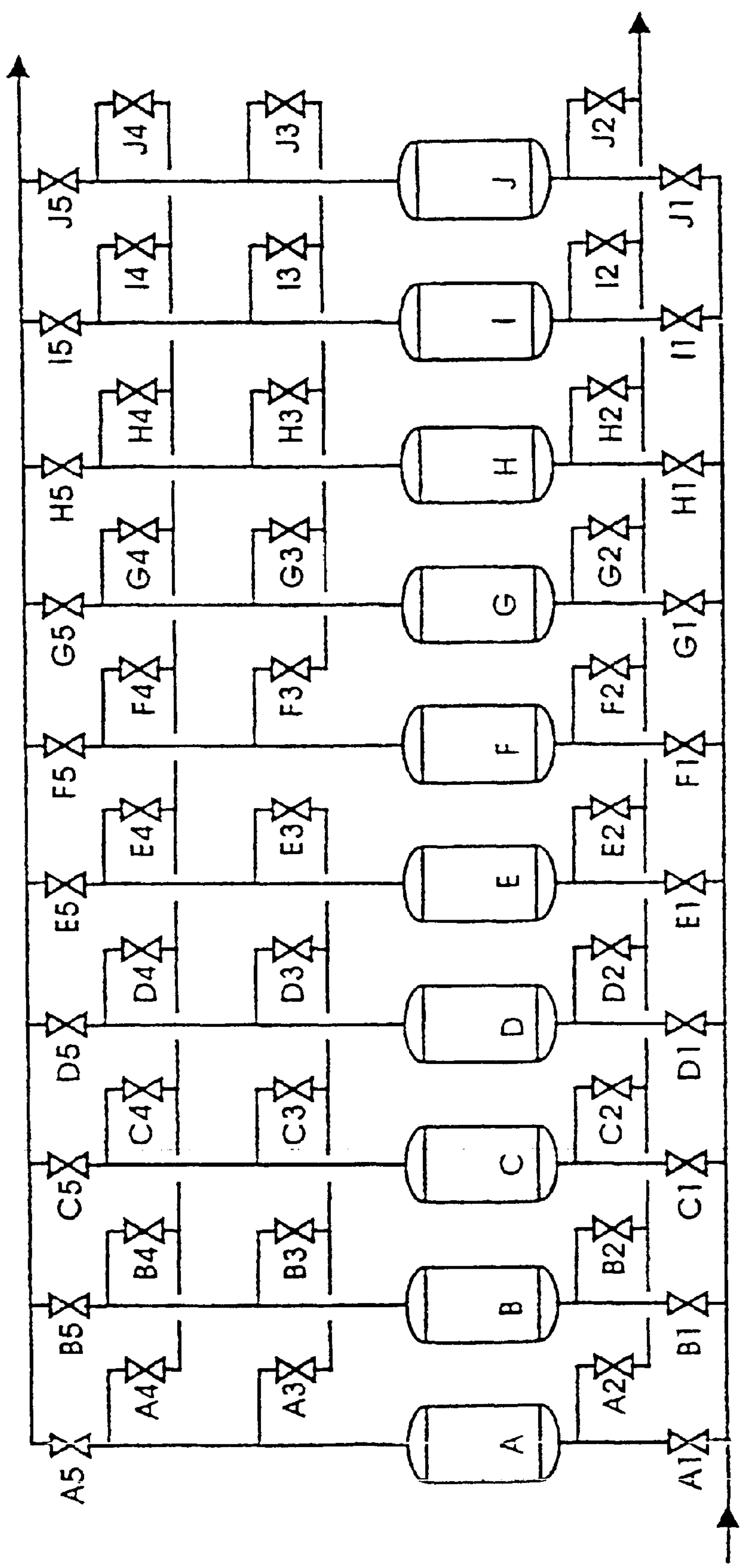
FIG. 24 is a schematic diagram illustrating yet another embodiment of the invention.
Figure 25B:
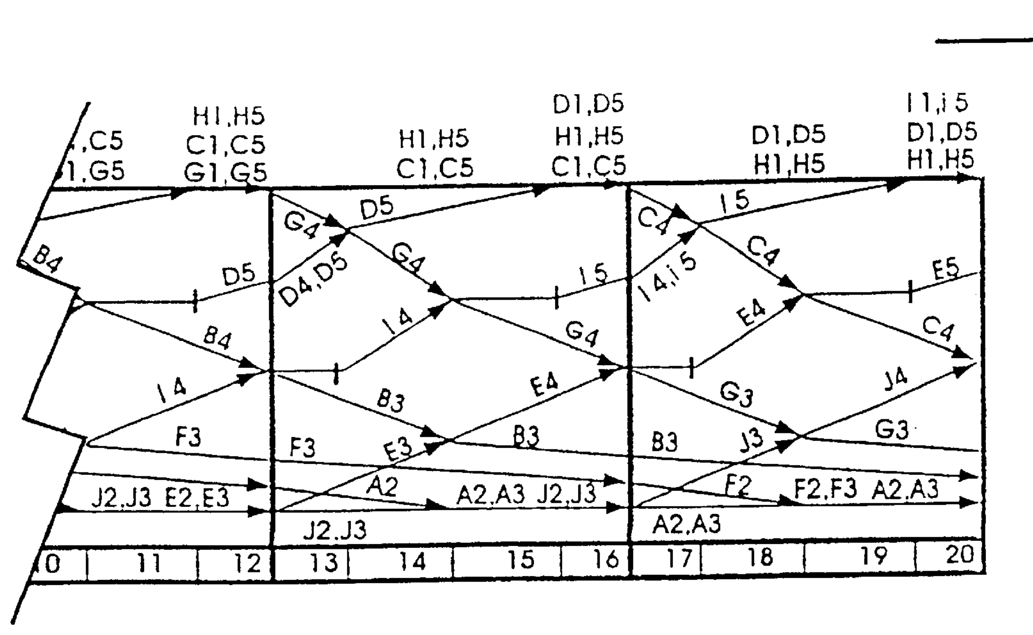
FIGS. 25*a*. and 25*b*. are cycle diagrams illustrating yet another embodiment of the invention.
Figure 25B:
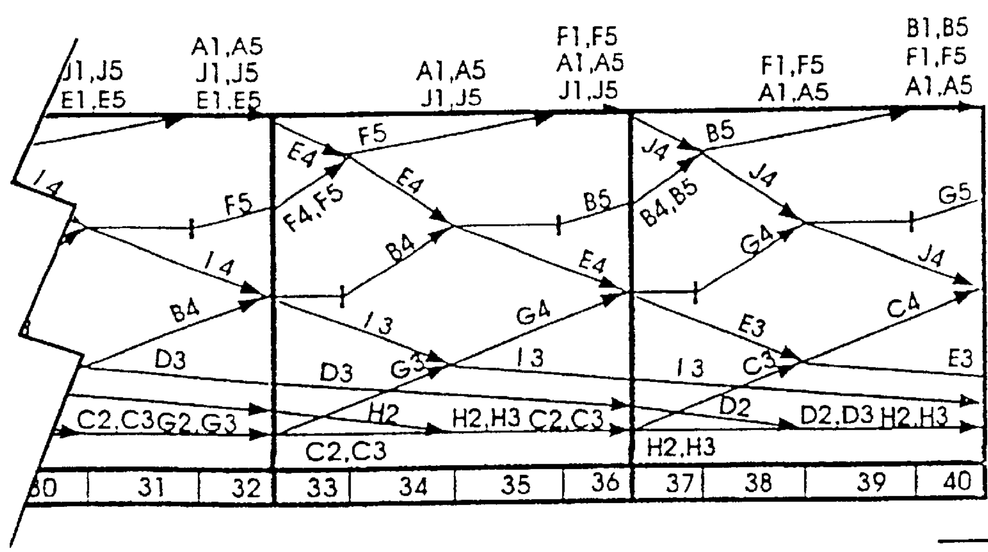

FIG. 24 shows the embodiment consisting of an assembly of ten adsorbers in alphabetical order indicated by A to J. Compared to the assembly of nine adsorbers of FIG. 22, subject assembly of ten adsorbers employs the same number of four pressure equilibrations, the difference being that in this subject case the time period taken for the recovery and use of purge gas is about 50 percent longer, while the required number of valves per adsorber is reduced by one. The number of adsorbers simultaneously being subjected to adsorption varies between two and three. FIG. 25 shows the pressure versus time diagram with 4 periods per cycle element. The provision of the additional pressure equilibration is shown in the periods 1, 5, 9, 13, 17, 21, 25, 29, 33, 37, etc., each time dividing the high level repressurization into three stages. Based on the use of equation 4 for sorption modulation, the IPR-value is: 78.3%, for DPN=3, SM=80% and SMEQ=20%. Comparing to prior art in accordance with the aforementioned U.S. Pat. No. 3,986,849, using a 10-adsorber system with DPN=3, not using sorption modulation and not comprising an additional pressure equilibration, the applicable equation 1 reveals an IPR-value of: 71.4% for SLDF=50%.

Figure 26:
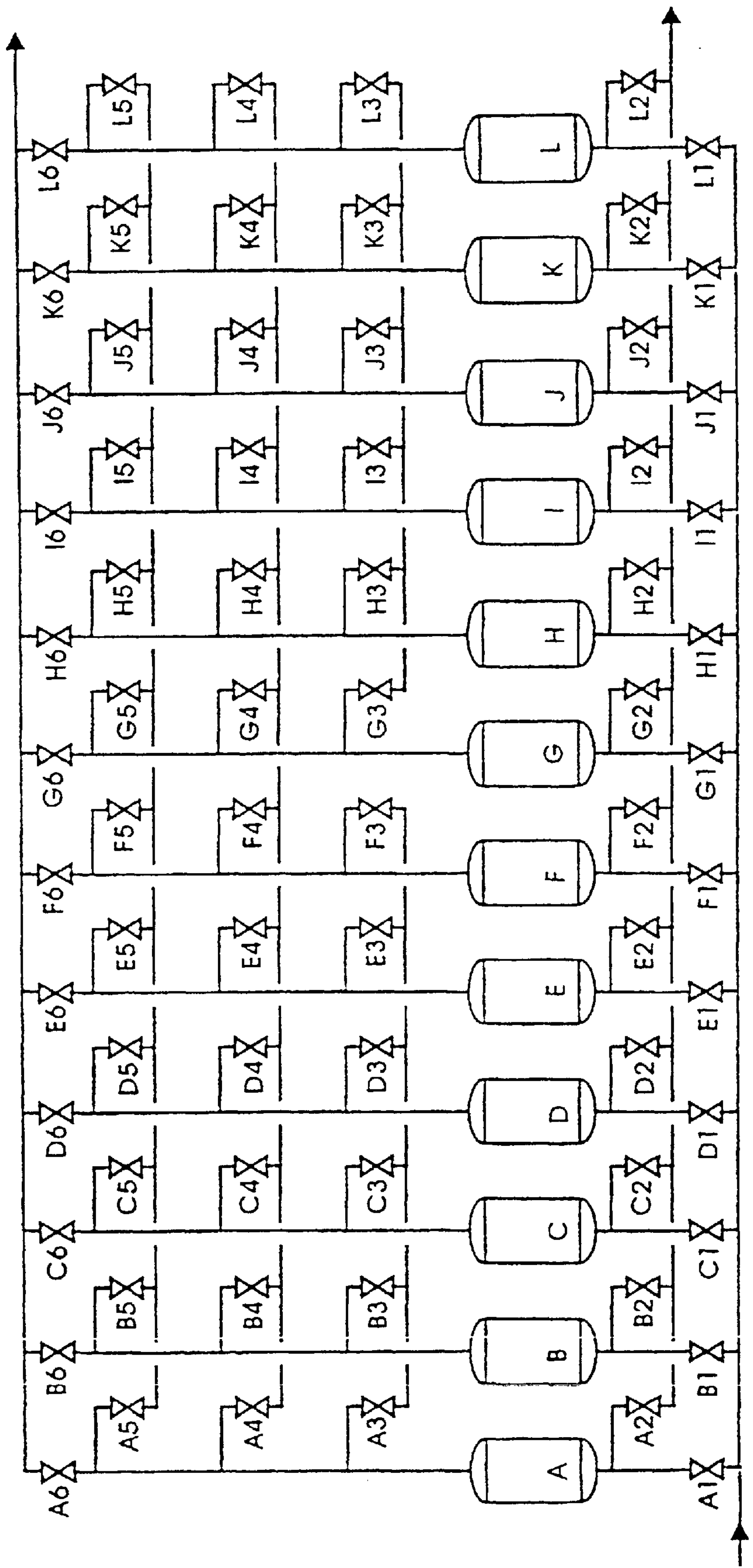
FIG. 26 is a schematic diagram illustrating yet another embodiment of the invention.
Figure 27A:
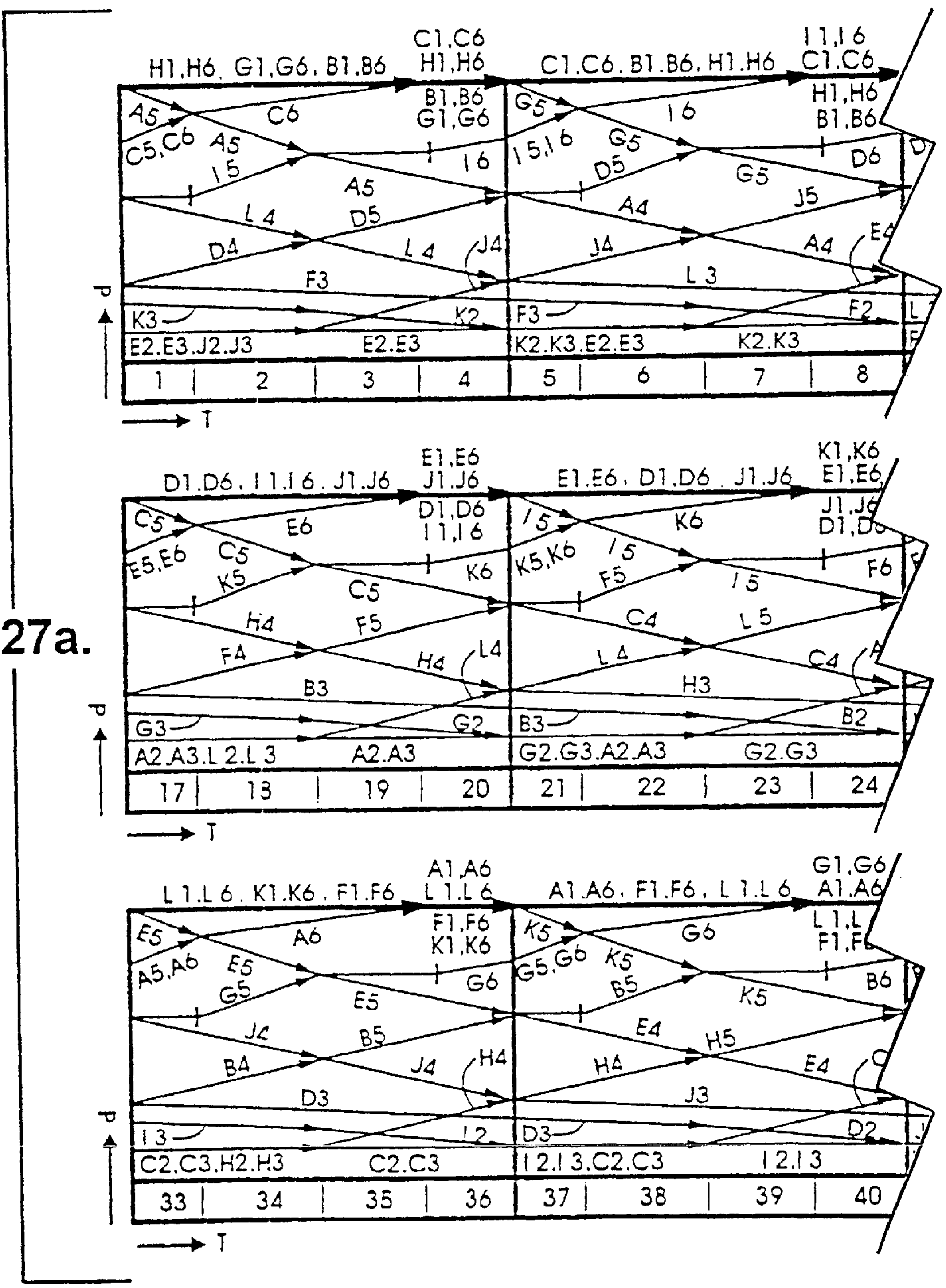
FIGS. 27*a*. and 27*b*. are cycle diagrams illustrating yet another embodiment of the invention.
Figure 27B:
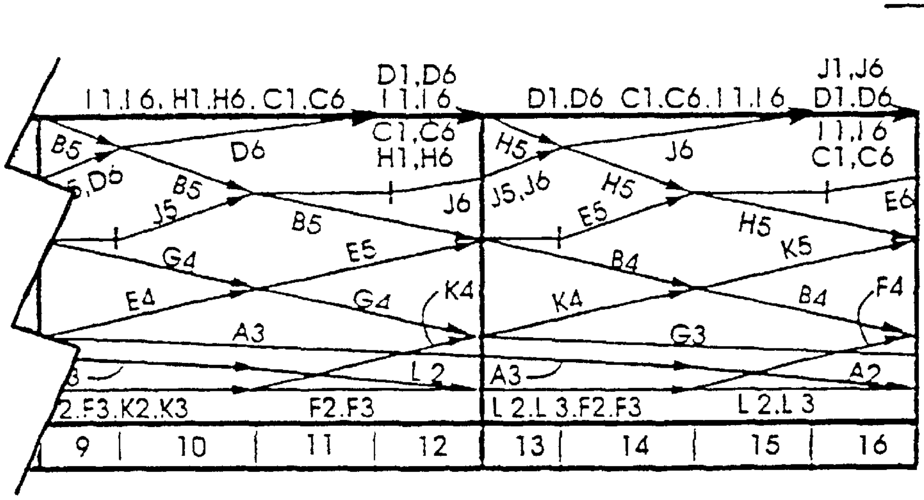
Figure 27B:
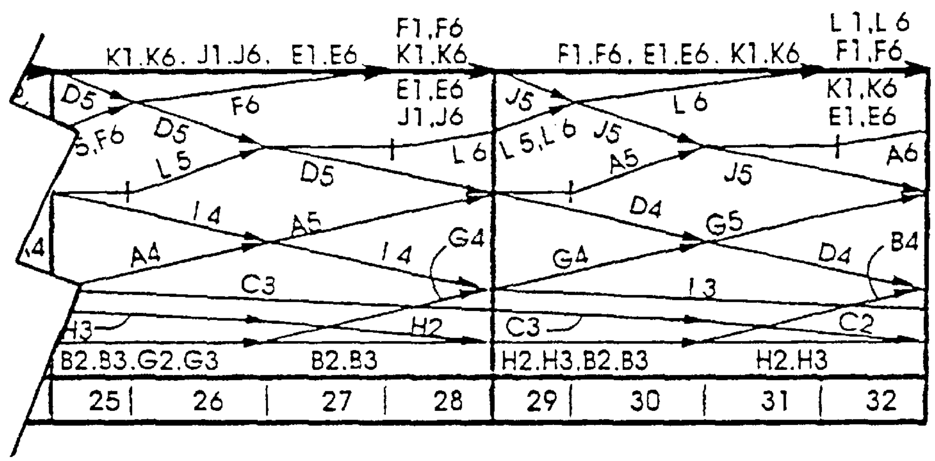
Figure 27B:
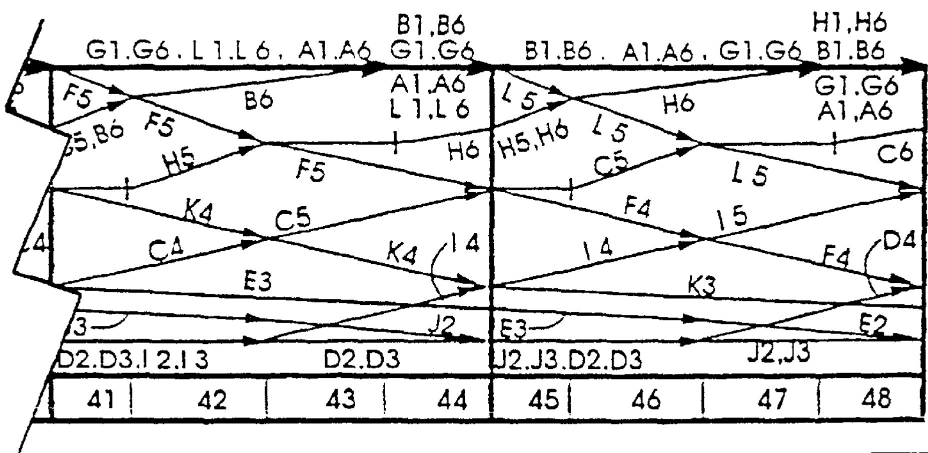
Figure 28A:
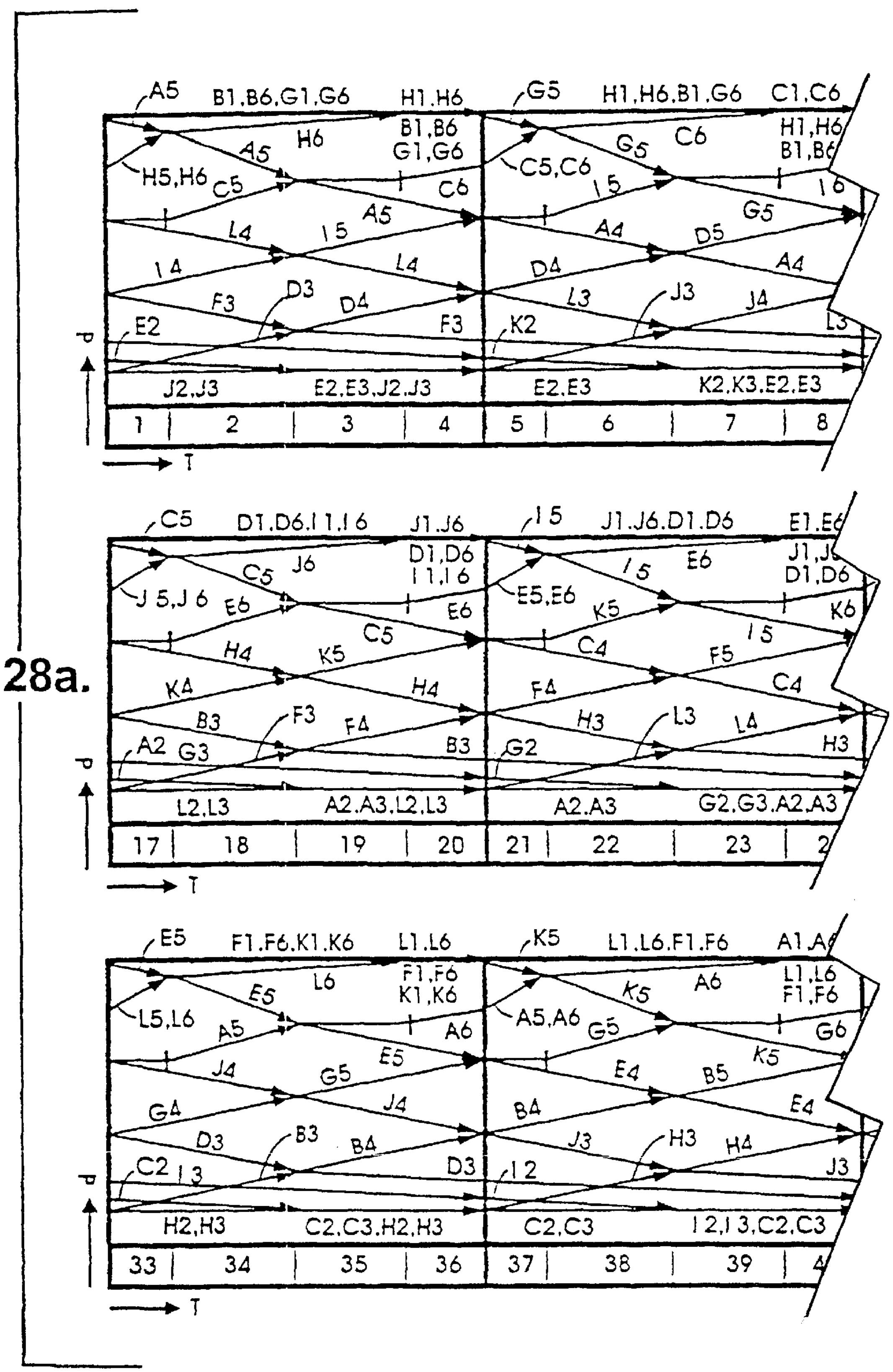
FIGS. 28*a*. and 28*b*. are cycle diagrams illustrating yet another embodiment of the invention.
Figure 28B:
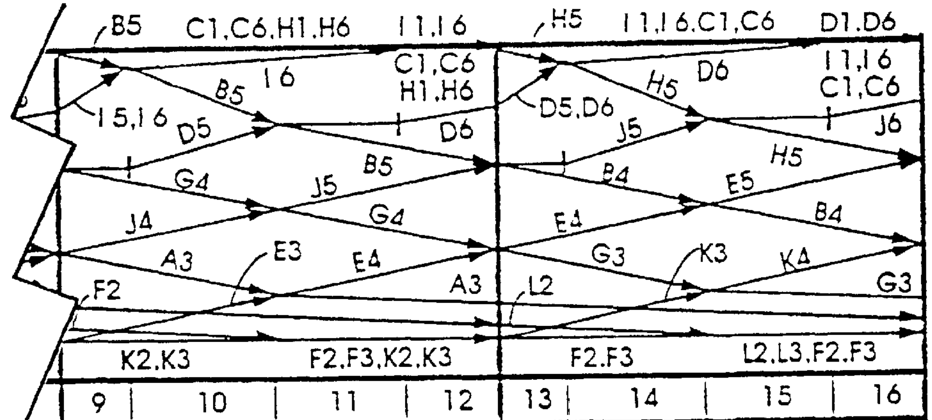
Figure 28B:
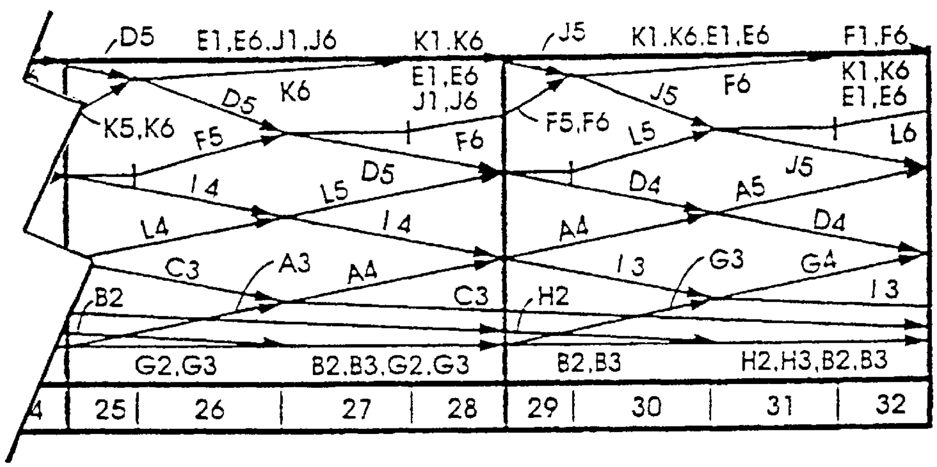
Figure 28B:
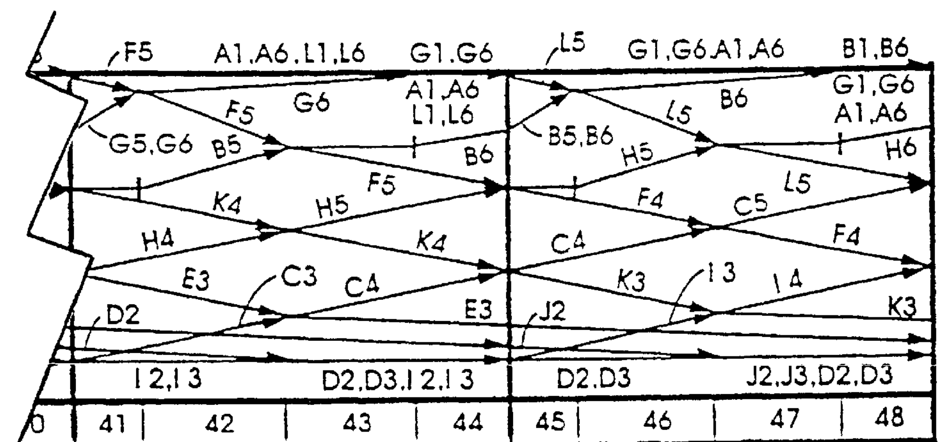

FIG. 26 shows the embodiment consisting of an assembly of twelve adsorbers in alphabetical order indicated by A to L. Compared to the assembly of ten adsorbers of FIG. 24, subject assembly of twelve adsorbers employs five instead of four pressure equilibrations, the difference being that in this subject case the number of adsorbers simultaneously being subjected to adsorption varies between three and four instead of between two and three. FIG. 27 shows the pressure versus time diagram with 4 periods per cycle element. The provision of the additional pressure equilibration is shown in the periods 1, 5, 9, 13, 17, 21, 25, 29, 33, 37, 41, 45, etc., each time dividing the high level repressurization into three stages. Based on the use of equation 4 for sorption modulation, the IPR-value is: 82.2%, for DPN=4, SM=80% and SMEQ=18%. Comparing to prior art, using a 12-adsorber system, with DPN=4, not using sorption modulation and not comprising an additional pressure equilibration, the applicable equation 1 reveals an IPR-value of: 77.8% for SLDF=50%.

Using a different process, based upon the same embodiment of FIG. 26, the number of pressure equilibrations is six instead of five, while the number of adsorbers simultaneously being subjected to adsorption varies between two and three, instead of between three and four. FIG. 28 shows the pressure versus time diagram with 4 periods per cycle element. The provision of the additional pressure equilibration is shown in the periods 1, 5, 9, 13, 17, 21, 25, 29, 33, 37, 41, 45, etc., each time dividing the high level repressurization into three stages. Based on the use of equation 4 for sorption modulation, the IPR-value is: 84.9%, for DPN=5, SM=78% and SMEQ=15%. Such a high IPR-value is advantageous when a relatively small quantity of purge gas is needed as in the case of a high ratio of feed gas pressure to purge gas pressure of at least 20, combined with a fairly high concentration of impurities in the feed gas of not less than 25 volume percent.

Figure 29:
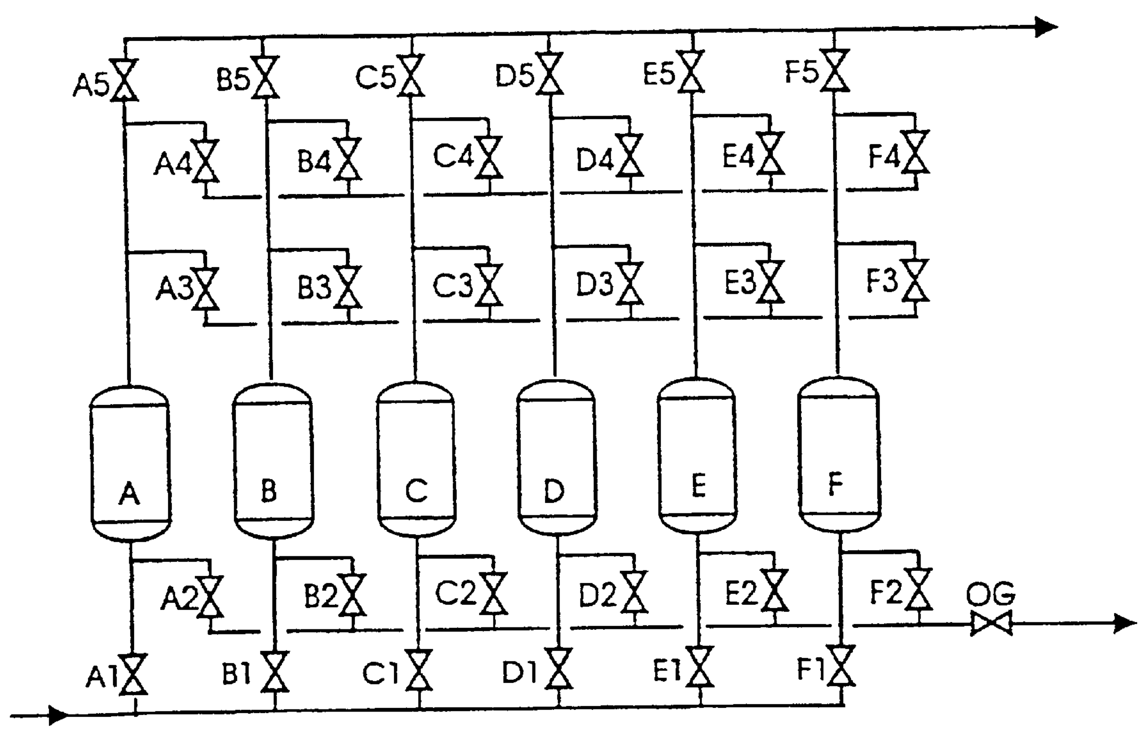
FIG. 29 is a schematic diagram illustrating yet another embodiment of the invention.
Figure 30:
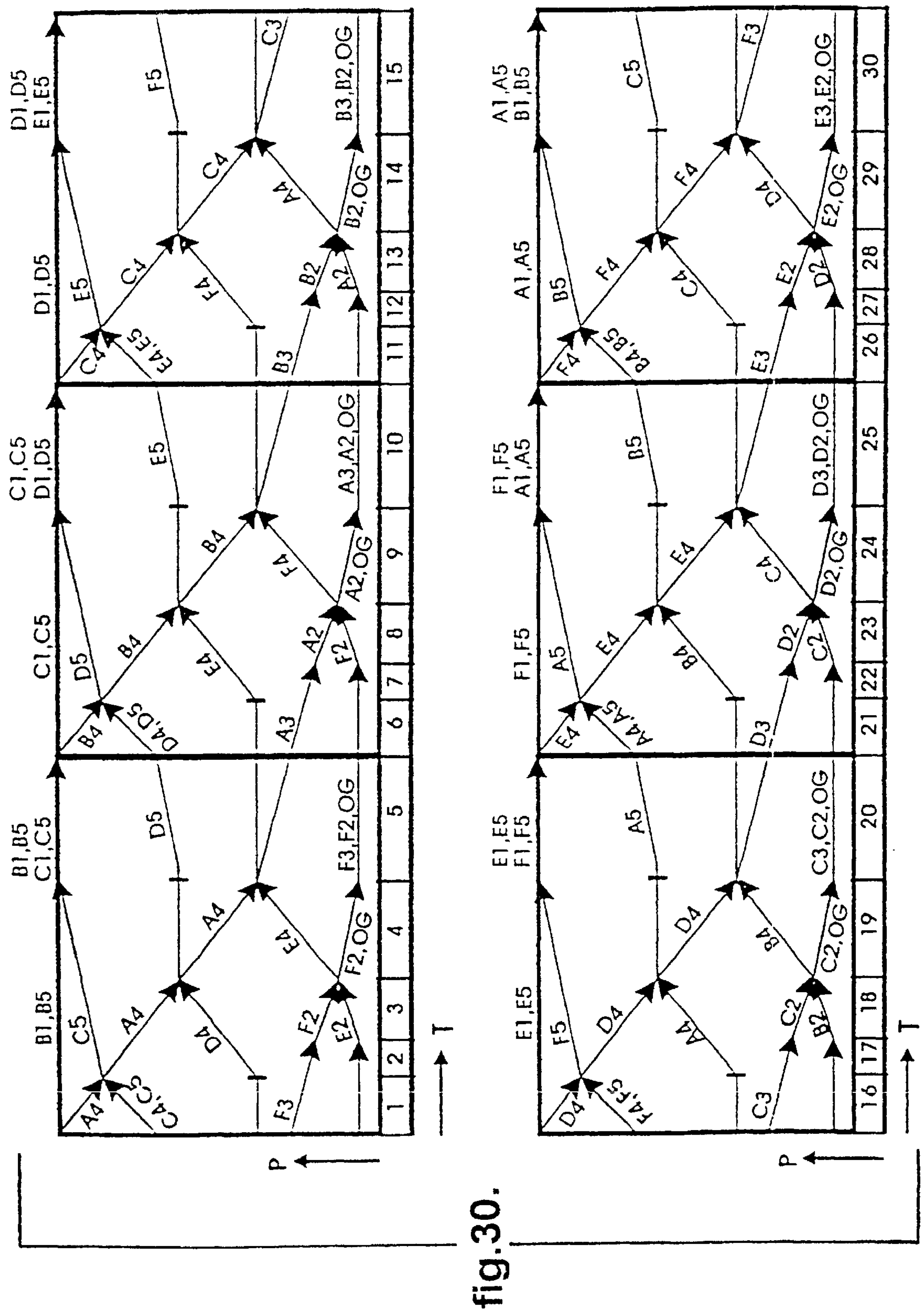
FIG. 30 is a cycle diagram illustrating yet another embodiment of the invention.

FIG. 29 shows the embodiment consisting of an assembly of six adsorbers in alphabetical order indicated by A to F, for using the combination of sorption modulation options SM and SMEQ, and dump return. The total number of pressure equilibrations is four, following three low level repressurization in countercurrent direction and one low level repressurization in cocurrent direction using dump return. FIG. 30 shows the pressure versus time diagram with 5 periods per cycle element. The typical features of this embodiment comprise the combination of, (1) the provision of the additional countercurrent pressure equilibration as shown in the periods 1, 6, 11, 16, 21, 26, etc., each time dividing the high level repressurization into three stages like among others in the previous case, using four adsorbers and (2) the provision of low level repressurization by dump return as shown in the periods 3, 8, 13, 18, 23, 28, etc.

Figure 31:
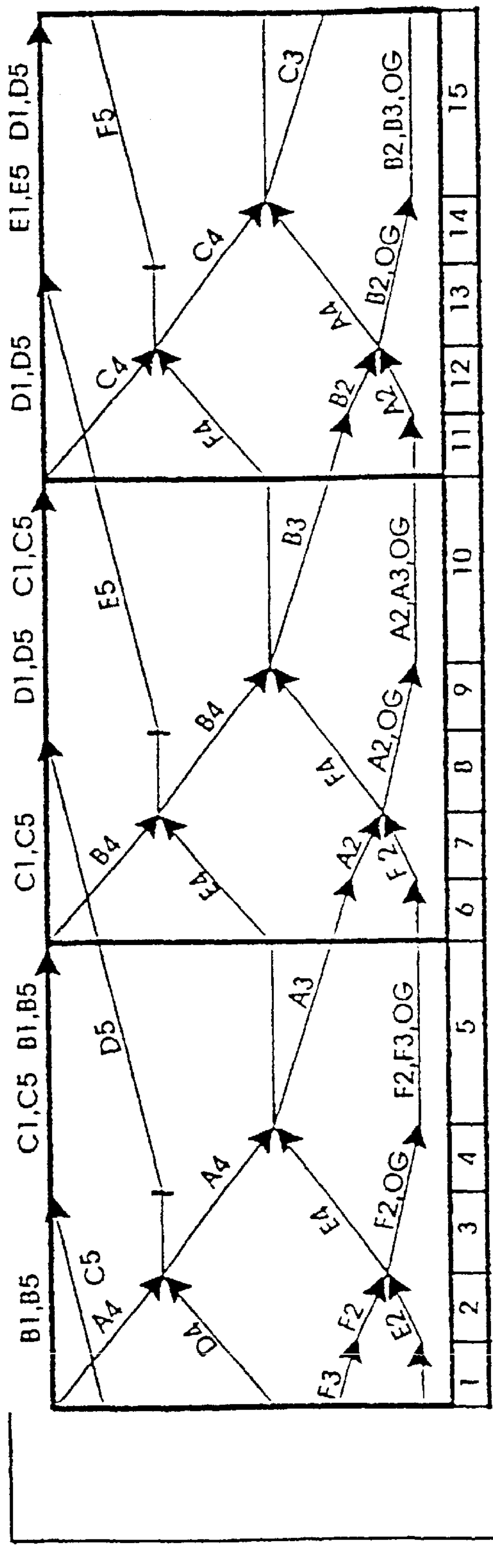
FIG. 31 is a cycle diagram illustrating yet another embodiment of the invention.
Figure 31:
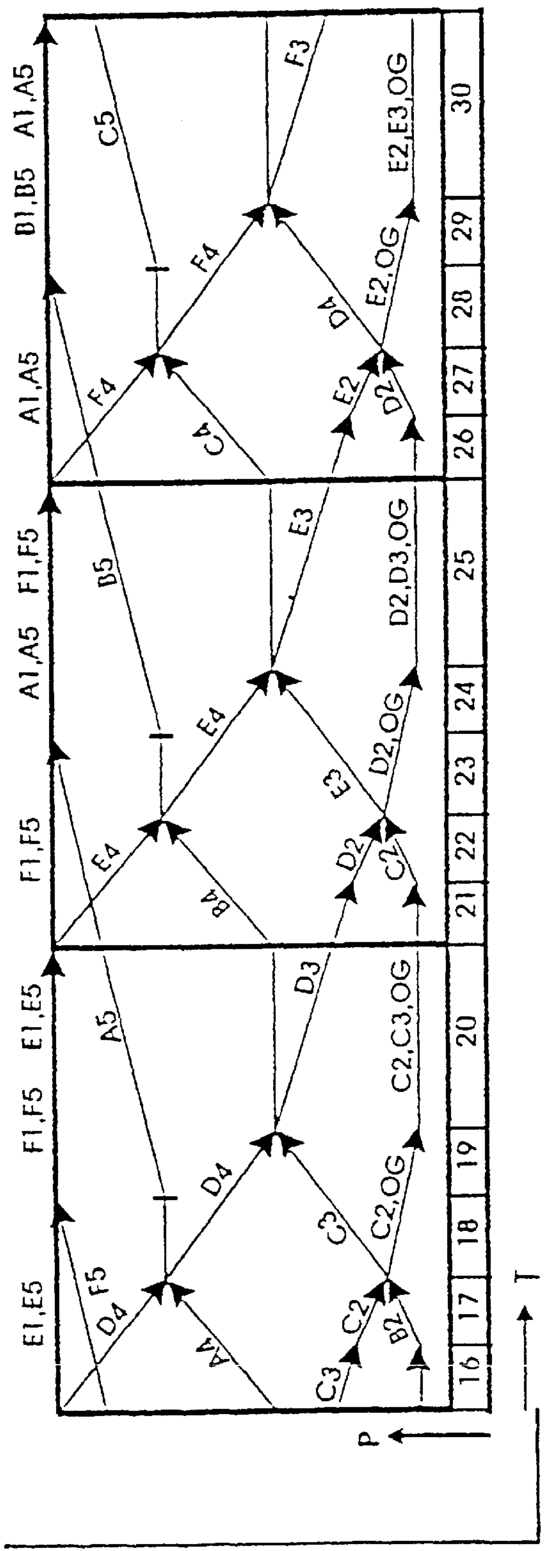
Figure 32:
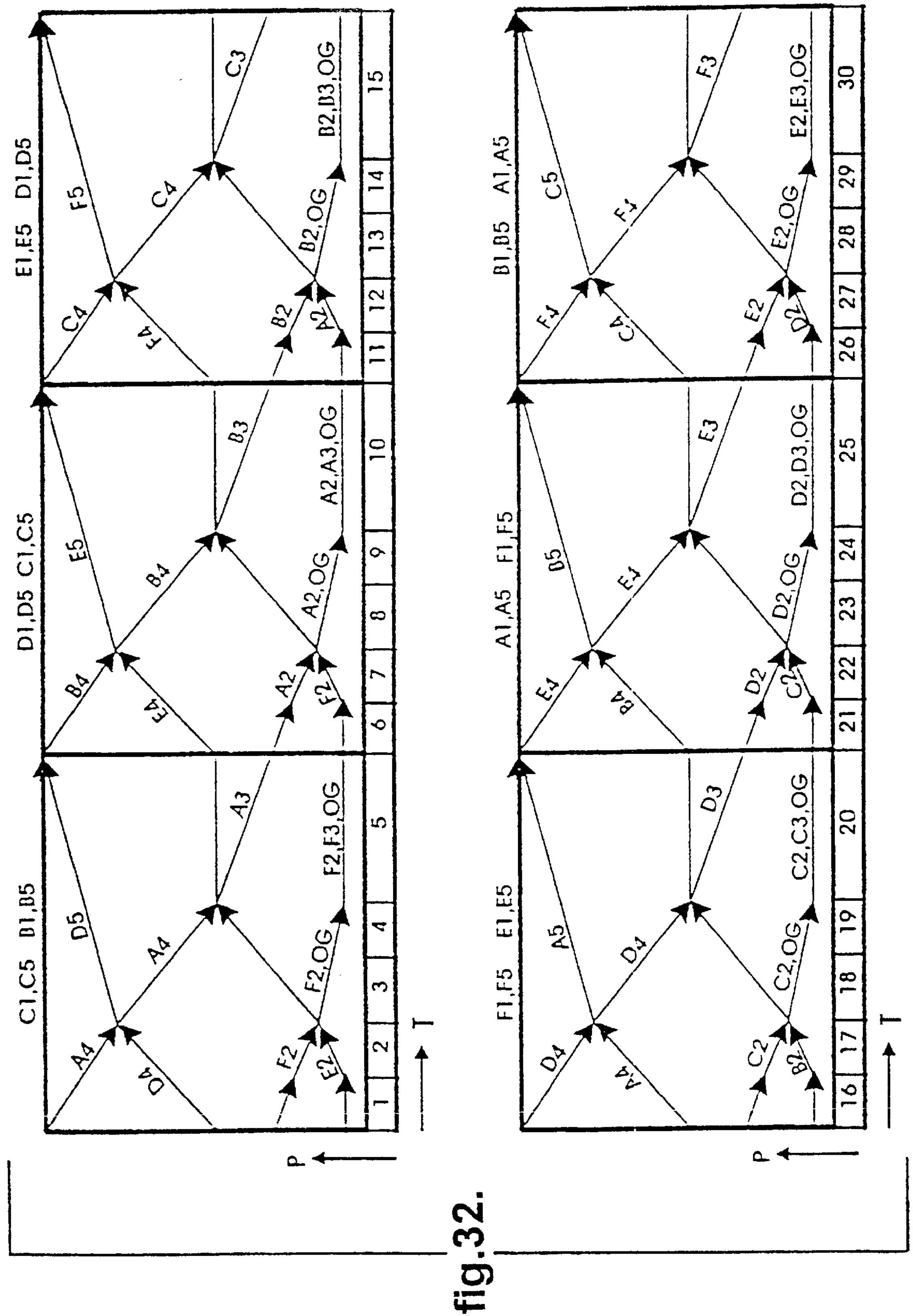
FIG. 32 is a cycle diagram illustrating yet another embodiment of the invention.

Based upon the adsorber assembly of FIG. 29, the combination of sorption modulation option SM and dump return may be used, hence without the additional pressure equilibration. Then the total number of pressure equilibrations is three, following low level repressurization, two in countercurrent direction and one in cocurrent direction using dump return. FIG. 31 shows the pressure versus time diagram with five periods per cycle element. The essential features of this variant comprise the combination of, (1) sorption modulation with option SM only, where the high level repressurization remains completely separated from the low level repressurization by the first part of secondary product gas in the periods 1, 2, 6, 7, 11, 12, 16, 17, 21, 22, 26, 27, etc. and (2) the provision of dump return in the periods 2, 7, 12, 17, 22, 27, etc. Dump return may also be applied without sorption modulation as shown in FIG. 32 with five periods per cycle element. Dump return takes place in the periods during the periods 2, 7, 12, 17, 22, 27, etc. Said assembly of six adsorbers, if made suitable for implementation, of dump return, or of one of the two variants of sorption modulation, option SM, or options SM including SMEQ, either combined or separately, offers a high degree of flexibility, with the possibility to switch between all these options during operation, including the processes of prior art as described in the above mentioned examples 1 and 2.

Figure 33:
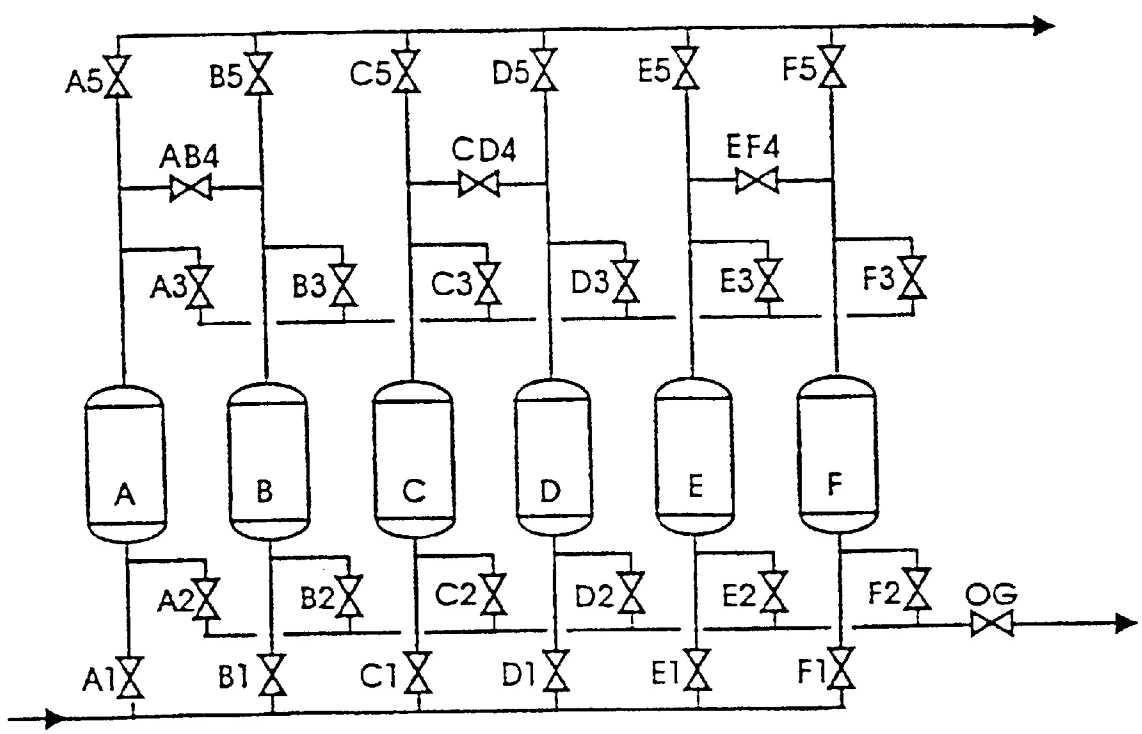
FIG. 33 is a schematic diagram illustrating yet another embodiment of the invention.
Figure 34:
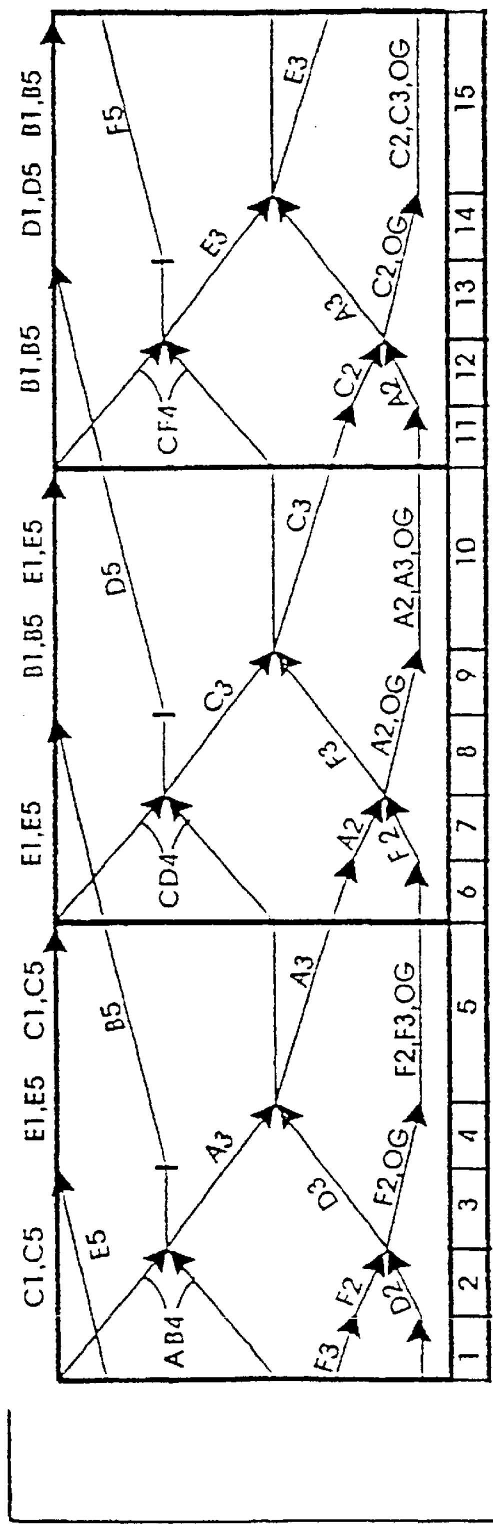
FIG. 34 is a cycle diagram illustrating yet another embodiment of the invention.
Figure 34:
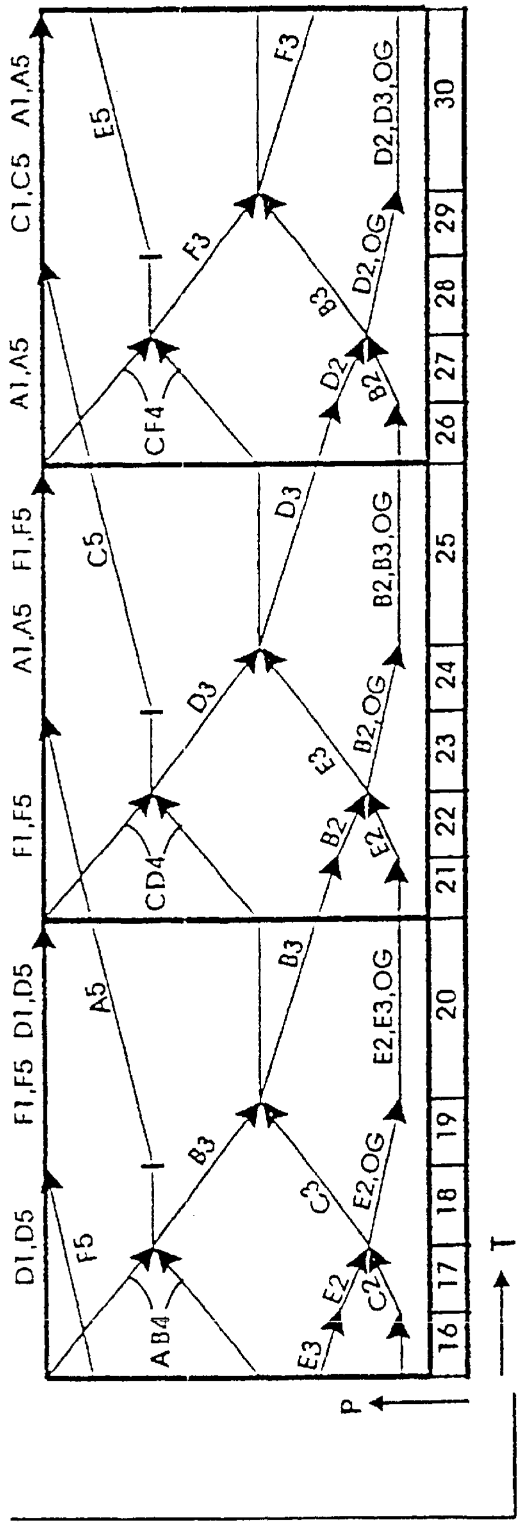
Figure 35:
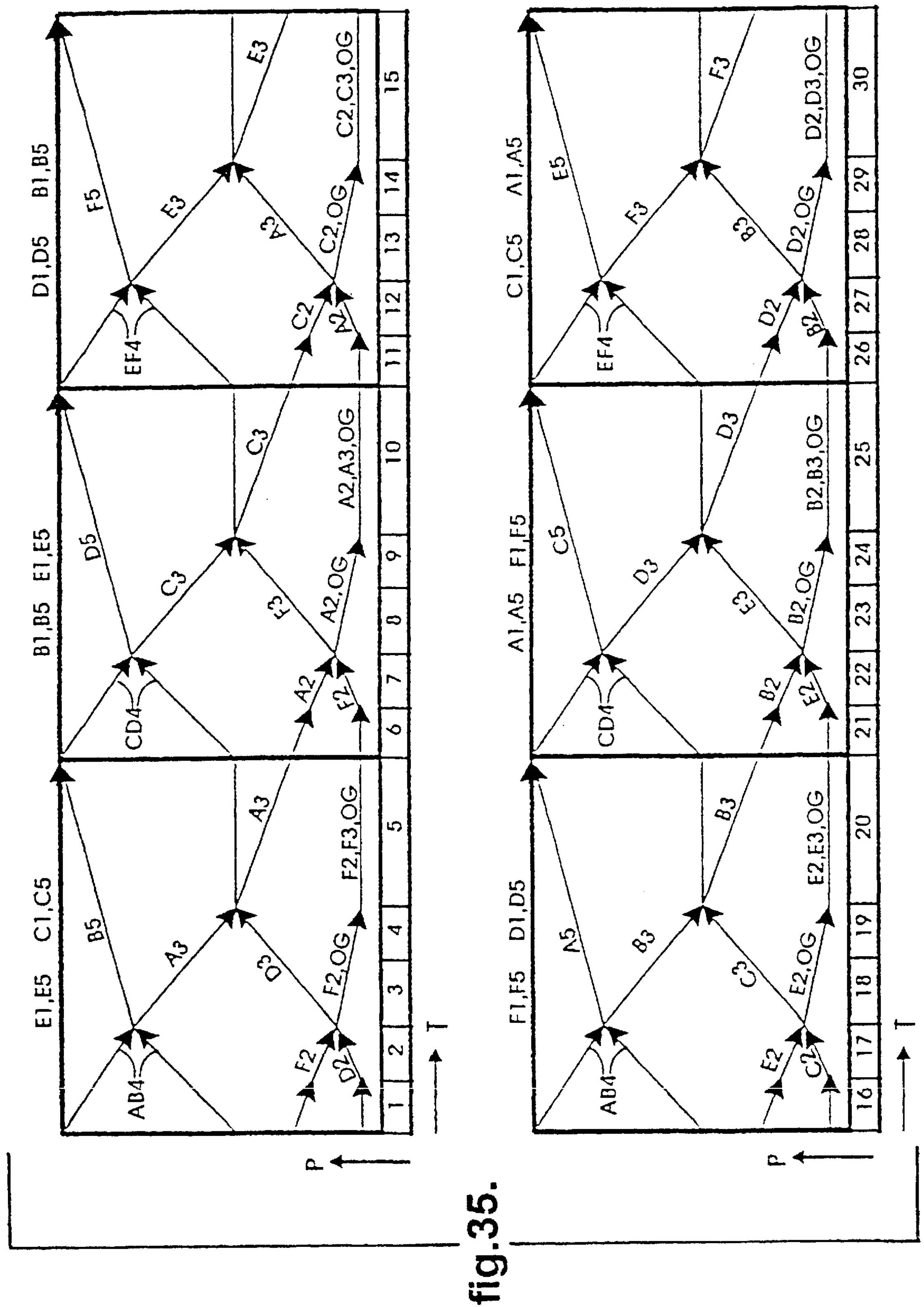
FIG. 35 is a cycle diagram illustrating yet another embodiment of the invention.

FIG. 33 shows a simplified arrangement of six adsorbers, whereby the number of valves is reduced by three and the use of sorption modulation is limited to option SM. Its reduced degree of flexibility still comprises all aforementioned possibilities of the arrangement as depicted by FIG. 29, except sorption modulation SM combined with SMEQ. Said simplified arrangement requires a predetermined and fixed sequence by which adsorbers undergo the process steps, which should appear after comparing to one another the FIGS. 34 and 31 and the FIGS. 35 and 32. In each of these comparisons, the valves A4 to F4 of FIG. 29 have been replaced by the valves AB4, CD4 and EF4. The following examples serve to demonstrate the benefits of this invention by comparing operating results therefrom to those based on prior art.

EXAMPLE 6

Gaseous hydrogen is recovered from a feed gas, produced by the steam reforming of naphtha and has the following specification. Composition in volume percent is: H2:75.99, CO:2.69, CH4:3.58, CO2:17.50, H2O: saturated, at the current pressure of 2670 kPa and a temperature of 38.0 deg. C. The pressure of the offgas is set at 150 kPa. The available pressure swing adsorption unit, consists of six adsorbers has been assembled as depicted by FIG. 14 and has been made suitable for operation according to this invention as well as according to prior art in accordance with FIG. 2. At an internal diameter of the adsorbers of 1800 mm, the adsorption zone has a total height of 6000 mm and consists, in the upper 18% part of zeolite molecular sieve of type 5A in the form of 1 to 2 mm granules without binder, the middle 73% part of activated carbon with an average particle diameter of 1.5 mm and the remaining lower part of narrow pore granulated silica gel with a diameter between 1 and 3 mm. The performance of the unit is summarized in TABLE 3 below.

TABLE 3

| | Prior art | This invention |
|---|---|---|
| Feed gas rate (Nm3/h) | 15075 | 15075 |
| Cycle time (min.sec) | 19.48 | 16.24 |
| Product gas rate (Nm3/h) | 10000 | 10218 |
| Impurity in product, CO (ppm) | 1 | 1 |
| Product recovery efficiency (%) | 87.3 | 89.2 |

Based on the same feed gas rate and product quality, it is demonstrated that the recovery efficiency, using this invention is increased by 2.18% or 1.9 percentage points in comparison to prior art.

EXAMPLE 7

Gaseous hydrogen is recovered from a feed gas, a byproduct from an oil refinery of the following composition in volume percent is: H2:66.205, CO:0.001, CH4:27.05, C2H6:6.60, C2H4:0.10, C6H6:0.043, C7H8:0.001, at a pressure of 2368 kPa and a temperature of 17.3 deg. C. The offgas is produced at the relatively high pressure of 420 kPa. The available pressure swing adsorption unit, consisting of six adsorbers has been arranged as depicted by FIG. 29 and has been made suitable for operation in accordance with each of the processes as indicated by the FIGS. 2, 3, 4, 5 or 15, 6 and 30. At a diameter of the adsorbers of 1800 mm, the adsorbent beds in each of them has a height of 7500 mm and each consisting of 86% of activated carbon as granules of 1 to 2 mm near the outlet part and small pore granulated silica gel with a diameter of between 1 and 3 mm near the inlet part. The performance of the unit is summarized in TABLE 4 and is based upon prior art in accordance with FIG. 2 and upon the process in accordance with this invention, based upon the use of sorption modulation SM including SMEQ and upon the use of dump return as depicted by FIG. 30.

TABLE 4

| Process: | Prior art according FIG. 2 | This invention according FIG. 30 |
|---|---|---|
| Feed gas rate (Nm3/h) | 15075 | 15075 |
| Cycle time (min.sec) | 19.48 | 16.24 |
| Product gas rate (Nm3/h) | 10000 | 10218 |

TABLE 4-continued

| Process: | Prior art according FIG. 2 | This invention according FIG. 30 |
|---|---|---|
| SM (%) | — | 75 |
| SMEQ (%) | — | 15 |
| Dump return (Nm3/step) | — | 100 |
| Impurity in product, CH4 (vppm) | 9810 | 9240 |
| C2H6 (vppm) | 147 | 155 |
| Product recovery efficiency (%) | 80.30 | 82.90 |

Based on the same feed gas rate and approximately similar product quality, it is demonstrated that in comparison to prior art, the recovery efficiency, using this invention is increased by 3.2% or 2.6 percentage points.

What is claimed is:

1. A pressure swing adsorption process, comprising efficiency improvements in a repetitive cycle, each cycle being divided into a number M of identical cycle elements and all functions occurring within each cycle element, the start and the end thereof coinciding with the end of an adsorption function, a pressure swing process is carried out for separation of gas mixtures by selective adsorption by at least one adsorbent, in granular or pellet shaped evenly packed in and equally distributed over an assembly of M' pressure vessels called adsorbers, each provided with an inlet end and an outlet end and in number equal to said number M of said identical cycle elements, whereby each adsorber, starting at a fixed position in time in one of said cycle elements is subjected to a fixed sequence of functions, comprising (1) adsorption—extending itself over at least one cycle element—of at least one component from a gas mixture, at a highest pressure and predominantly existing of one or more of the least adsorbable components, cocurrently flowing from the inlet part to the outlet part thereof, at said outlet part recovering primary product gas, (2) with its inlet end closed, cocurrent depressurization, starting at said highest pressure, producing at its outlet end secondary product gas of near primary product quality, by N−1 of N depressurization steps in behalf of fractional repressurization, each time of an other adsorber through the outlet end thereof until pressure equilibrium is reached at the end of each step reaching a lower pressure, and by one other depressurization step in behalf of the provision of purge gas for purging at least one other adsorber, (3) with its outlet end closed, countercurrent depressurization until a lowest pressure is reached, thereby producing at its inlet end dump gas containing next to some of the least adsorbable component other, during this step, desorbed components, (4) countercurrent purging with purge gas, flowing from the outlet end to the inlet end thereof, thereby producing offgas which contains next to some least adsorbable component the remainder of desorbed components and whereby said purge gas is produced as secondary product gas by another adsorber during one of its N cocurrent depressurization steps, (5) with its inlet end closed, repressurization by introducing via its opened outlet end, (5A) of secondary product gas simultaneously being produced by other adsorbers by N−1 cocurrent depressurization steps until pressure equilibration is reached, each time at a higher pressure at the end of each of such steps and (5B) in at least one additional countercurrent admission step, by primary product gas produced by at least one other adsorber, until the highest pressure is attained, the improvements (a) and (b), comprising:

(a) an increase of the product recovery efficiency in case at least temporarily, L adsorbers are parallel switched on adsorption function and whereby each adsorption function takes more than one cycle element and the number of countercurrent repressurization steps being one more than the number of cocurrent depressurization steps such that, repressurization by a part of primary product gas takes place by admitting this in at least three portions, one in each of the last three of N+1 admission steps, (1) by only the first portion, during the second before last admission step, between a time fraction SM of a cycle element and the end thereof, (2) by the second portion together with secondary product gas during the first before last admission step, the beginning thereof coinciding (2A) with the transition to the next cycle element, (2B) with the switching off of the adsorption function of an other adsorber from adsorption, thereby decreasing with one the number of adsorbers with switched on adsorption function, and wherefrom during the first of its N release steps said secondary product is produced until pressure equilibration is attained at the end of said first before last admission step, coinciding with the point in time of a fraction SMEQ of the duration of said next cycle element, (3) during the last admission step by only the third portion until the highest pressure is attained, coinciding with the fraction SM of the duration of said next cycle element, such that the end of said last admission step coincides with the second before last of the N+1 countercurrent repressurization steps of the next in the sequence of adsorbers and with the start of the adsorption step, increasing the number of adsorbers with switched on adsorption functions by one, and (b) an increase of the product recovery efficiency, prior to said countercurrent repressurization, by one cocurrent repressurization step with its outlet end closed, through admitting the first part of dump gas produced by an other adsorber until at most pressure equilibration is reached.

2. The process according to claim 1, wherein in improvement (a) M equals minimum 4 till maximum 5, N=M−1, L=2 and the installation of a pressure vessel for storage of secondary product gas is included, said gas originating from the last of the N cocurrent depressurization steps until pressure equilibration is attained, followed by release of said gas for its utilization as purge gas at the lowest pressure.

3. The process according to claim 2, wherein said pressure vessel is filled with inert material in a loosely and evenly distributed packing of high void fraction.

4. The process according to claim 1, wherein in improvement (b) M equals minimum 4 till maximum 5 and N=M−2.

5. The process according to claim 1, wherein in improvement (b) M equals minimum 6 till maximum 8, N=3 and two adsorbers are parallel switched on adsorption function.

6. The process according to claim 1, wherein in improvement (b) M=8, N=4 and two adsorbers are parallel switched on adsorption function.

7. The process according to claim 1, wherein in improvement (b) M equals minimum 9 till maximum 10, N=4 and at least three adsorbers are parallel switched on adsorption function.

8. The process according to claim 1, wherein in improvement (b) M=12, N equals minimum 5 till maximum 6 and 9-N adsorbers are parallel switched on adsorption function.

9. The process according to claim 1, wherein in improvement (a) M equals minimum 6 till maximum 12, secondary product gas from the last of N depressurization steps is used as purge gas, while the secondary product gas used for repressurization and admitted with admission steps number 1 to N−2 is produced by the numbers N−1 to 2 respectively of said N depressurization steps, after which repressurization is continued with admission step N−1, exclusively by the first portion of the primary product split-off, followed with admission step number N by secondary product gas from the first of said N depressurization steps in admixture with the second portion of said primary product split-off till pressure equilibration is attained and finally for admission step number N+1 exclusively by the third portion of said primary product split-off.

10. The process according to claim 9, wherein M equals minimum 6 to maximum 7, N=4 and L=2.

11. The process according to claim 9, wherein M=8, N=5 and L=2.

12. The process according to claim 9, wherein M equals minimum 9 to maximum 10, N=5 and L=3.

13. The process according to claim 9, wherein M=12, N equals minimum 6 to maximum 7 and L=10-N.

14. The process according to claim 1, wherein in improvement (a) M' equals 6 or 8 or 10 adsorbers, secondary product gas from the one before the last of N de-pressurization steps is used as purge gas, while the secondary product gas used for repressurization and admitted with admission steps number 1 to N−2 is produced by the numbers N, N−2 to 2 respectively of said N depressurization steps, after which repressurization is continued with admission step N−1, exclusively by the first portion of the primary product split-off, followed with admission step number N by secondary product gas from the first of said N depressurization steps in admixture with the second portion of said primary product split-off till pressure equilibration is attained and finally for admission step number N+1 exclusively by the third portion of said primary product split-off.

15. The process according to claim 14, wherein M'=6, N=5 and L=2.

16. The process according to claim 14, wherein M'=8, N=5 and L=2.

17. The process according to claim 14, wherein M'=10, N=6 and L=3.

18. The process according to claim 1, wherein the least adsorbable component is hydrogen.

19. The process according to claim 1, wherein the least adsorbable component is nitrogen.

20. The process according to claim 1, wherein the least adsorbable component is methane.

21. The process according to claim 1, wherein SM is varied between 40 to 100% of the duration of a cycle element.

22. The process according to claim 1, wherein SMEQ is varied between 5 and 50% of the duration of a cycle element.

23. The process according to claim 1, wherein primary product gas split-off, used for repressurization of each adsorber, is directly metered from the product header through a control valve, directly connecting said adsorber with said product header.

24. The process according to claim 23, wherein control valves, directly connecting an outlet end of each adsorber with said product header, are used for controlling the distribution of feed gas over adsorbers with parallel switched adsorption functions.

25. The process according to claim 24, wherein distribution of feed gas is controlled such that its admission speed to an adsorber during a time span between the fraction SM and the end of the cycle element, said end coinciding with the end of the adsorption function thereof, is reduced to at least 25% of its maximum value.

* * * * *